United States Patent
Sasaki

(10) Patent No.: US 9,048,953 B2
(45) Date of Patent: Jun. 2, 2015

(54) OPTICAL COMMUNICATION SYSTEM, OPTICAL TRANSMITTER, AND TRANSPONDER

(75) Inventor: Shinya Sasaki, Sapporo (JP)

(73) Assignee: HITACHI, LTD., Tokyo (JP)

( * ) Notice: Subject to any disclaimer, the term of this patent is extended or adjusted under 35 U.S.C. 154(b) by 188 days.

(21) Appl. No.: 13/988,522

(22) PCT Filed: Nov. 29, 2010

(86) PCT No.: PCT/JP2010/071270
§ 371 (c)(1),
(2), (4) Date: Aug. 1, 2013

(87) PCT Pub. No.: WO2012/073308
PCT Pub. Date: Jun. 7, 2012

(65) Prior Publication Data
US 2013/0315267 A1  Nov. 28, 2013

(51) Int. Cl.
*H04B 10/25* (2013.01)
*H04B 10/556* (2013.01)
*H04B 10/67* (2013.01)
*H04L 27/20* (2006.01)
*H04L 27/22* (2006.01)
*H04L 27/26* (2006.01)

(52) U.S. Cl.
CPC ............ *H04B 10/25* (2013.01); *H04B 10/5563* (2013.01); *H04B 10/675* (2013.01); *H04L 27/2096* (2013.01); *H04L 27/223* (2013.01); *H04L 27/2697* (2013.01)

(58) Field of Classification Search
CPC .. H04B 10/5563; H04B 10/25; H04B 10/675; H04L 27/2697; H04L 27/223; H04L 27/2096
USPC .............................................. 370/536; 398/76
See application file for complete search history.

(56) References Cited

U.S. PATENT DOCUMENTS

| | | | |
|---|---|---|---|
| 2009/0180778 A1* | 7/2009 | Rhee et al. ...................... 398/79 |
| 2010/0046961 A1* | 2/2010 | Tanimura et al. .............. 398/159 |
| 2010/0098411 A1* | 4/2010 | Nakashima et al. ............ 398/25 |
| 2010/0215373 A1* | 8/2010 | Iwamura et al. ................. 398/98 |
| 2010/0220376 A1* | 9/2010 | Kobayashi et al. ............ 359/238 |
| 2010/0239253 A1* | 9/2010 | Lin et al. .......................... 398/63 |
| 2012/0106618 A1* | 5/2012 | Kudo et al. .................... 375/232 |

FOREIGN PATENT DOCUMENTS

| JP | 2010-213223 A | 9/2010 |
|---|---|---|
| WO | 2009/104758 A1 | 8/2009 |
| WO | 2010/073990 A1 | 7/2010 |

OTHER PUBLICATIONS

Schmidt et al., "Low Sampling Rate Transmitter for Direct-Detection Optical OFDM", Monash University, 2009, Australia.

* cited by examiner

*Primary Examiner* — Brian D Nguyen
(74) *Attorney, Agent, or Firm* — Volpe and Koenig, P.C.

(57) ABSTRACT

A technique for reducing a necessary bandwidth of an optical receiver in an optical OFDM communication system is disclosed. Optical OFDM signals of different spectra are alternately transmitted for each OFDM symbol time, and; after this light is transmitted via an optical fiber, the light undergoes photoelectric conversion by a delay interferometer having a delay time equal to one symbol time and a balanced direct detection receiver and is received.

12 Claims, 23 Drawing Sheets

OPTICAL COMMUNICATION SYSTEM, OPTICAL TRANSMITTER, AND TRANSPONDER

TECHNICAL FIELD

The present invention relates to an optical communication system, an optical transmitter, and a transponder, particularly to an optical OFDM communication system using multicarrier, and, more specifically to an optical communication system, an optical transmitter, and a transponder, capable of reducing a necessary bandwidth of an optical receiver in an optical Orthogonal Frequency Division Multiplexing (OFDM) communication system.

BACKGROUND ART

A number of optical communication systems which have been put into practical use hitherto employ a binary modulation and demodulation technique using light intensity. Specifically, "0" and "1" of digital information are converted into ON and OFF of light intensity on a transmission side, the converted light is transmitted to an optical fiber, and the light propagating through the optical fiber undergoes photoelectric conversion on a reception side so as to be restored to original information. In recent years, with the explosively widespread use of the Internet, there has been a rapid increase of communication capacity which is a requirement of the optical communication system. A demand for a large communication capacity has been handled hitherto by increasing a speed of ON and OFF of light, that is, a modulation speed. However, the method of realizing a large capacity by increasing a modulation speed generally has the following problems.

If a modulation speed increases, there is a problem in that an allowable transmission distance limited by chromatic dispersion of an optical fiber is shortened. Generally, a transmission distance limited by the chromatic dispersion is shortened in proportion to the square of a bit rate. That is, if a bit rate doubles, a transmission distance limited by the chromatic dispersion becomes ¼. Similarly, if a modulation speed increases, there is also a problem in that an allowable transmission distance limited by polarization mode dispersion of an optical fiber is shortened. Generally, if a bit rate doubles, a transmission distance limited by the polarization mode dispersion becomes ½. When influence of the chromatic dispersion is described in detail, a transmission distance limited by the chromatic dispersion is 60 km if a normal dispersion fiber with a bit rate of 10 Gbps is used, but the distance is shortened to approximately 4 km if a system with a bit rate of 40 Gbps is used. Further, in a case of a 100 Gbps system of the next generation, a transmission distance limited by the chromatic dispersion becomes 0.6 km, and thus a trunkline optical communication system with a transmission distance of about 500 km cannot be realized in this state. In order to build an ultra-high speed trunkline optical communication system, a special optical fiber such as a so-called dispersion compensation fiber which has negative chromatic dispersion is currently installed in a relay or a transceiver so as to cancel out chromatic dispersion in a transmission path. This special fiber is expensive, and advanced design for determining an amount of dispersion compensation fiber installed in the transceiver or the optical relay is necessary, and both of them contribute to increase of the price of the optical communication system.

Therefore, in recent years, a study on an optical communication system using an OFDM technique has been attracting attention as an optical modulation and demodulation scheme for increasing a communication capacity. The OFDM technique is a technique in which amplitude and phase of each of a plurality of sine waves (called subcarriers) which are orthogonal to each other for one symbol time, that is, they have a frequency of integer multiples of a reciprocal of one symbol time are set to predetermined values, so as to carry information (modulate), and a carrier is modulated with a signal bundling these subcarriers and is transmitted. The OFDM technique is practically used for a Very high bit rate Digital Subscriber Line (VDSL) system which performs communication between a telephone service and households, a power-line communication system at home, or a digital terrestrial TV system. In addition, the technique is scheduled to be used for the next generation mobile phone system.

An optical OFDM communication system is a communication system which uses light as a carrier and employs the OFDM technique. In the OFDM technique, a plurality of subcarriers are used as described above, and, for example, a multilevel modulation method such as 4-QAM, 8-PSK, or 16-QAM can be used as a modulation method of each subcarrier, and thus one symbol time becomes much longer than a reciprocal of a bit rate. As a result, a transmission distance limited by the above-described chromatic dispersion or polarization mode dispersion becomes sufficiently longer than a transmission distance (for example, 500 km in a domestic trunkline system) expected in the optical communication system, and thereby the above-described dispersion compensation fiber becomes unnecessary. As a result, there is a possibility that a low cost optical communication system may be realized.

In an optical communication system using a direct detection reception method, unlike in a wireless communication system, a received optical current is proportional to the square of an absolute value of a field of light (on the other hand, in the wireless communication system, a current flowing through a reception antenna is proportional to a field). Due to this feature, a problem which is not present in the wireless OFDM communication occurs in the optical OFDM communication using the direct detection reception method. That is, since a received optical current is proportional to the square of an absolute value of an optical field, there is a problem in that a beat signal between subcarriers interferes with an original signal. This problem is hereinafter referred to as inter-subcarrier beat interference.

CITATION LIST

Non Patent Literature

[NPL 1] Brendon J. C. Schmidt, Arthur J. Lowery and Liang B. Du, "Low Sampling Rate Transmitter for Direct-Detection Optical OFDM", OFC/NFOEC 2009, OWM4, 2009

SUMMARY OF INVENTION

Technical Problem

In optical OFDM communication in the related art, a proposal to prevent the inter-subcarrier beat interference has been submitted. The proposal is that a carrier is also transmitted along with a subcarrier signal which is an optical signal transmitted from a transmitter, and a guard band is provided on a frequency axis between the carrier and the subcarrier signal. A spectrum of the optical OFDM signal is shown in FIG. 3. As can be seen from this figure, a plurality of subcarriers which are an OFDM signal and the carrier are simultaneously transmitted, the guard band of which a bandwidth is substantially the same as the bandwidth (B) of the OFDM signal is set on the frequency axis between the carrier and the OFDM signal. A spectrum of an optical current when the optical OFDM signal is directly detected and is received is shown in FIG. 4. As can be seen from this figure, inter-subcarrier beat signals are present on a low frequency side of the signals (beat signals of the carrier and the subcarriers) which should originally be received, and since these can be separated on the frequency axis, there is no influence on reception characteristics. This is a method for preventing the inter-subcarrier beat interference which is proposed in the optical OFDM communication in the related art.

This method for preventing the inter-subcarrier beat interference has two problems. First, in order to generate the optical OFDM signal having the spectrum of FIG. 3, it is necessary to generate signals including a carrier, and thus a high frequency circuit of an optical transmitter, particularly, a digital-analog converter (for example, corresponding to the reference numerals 116 and 116-1 of FIG. 2 described later) is required to be operated at ultra high speed. This is the first problem. More specifically, in a case where a device which can originally generate a base band OFDM signal at speed of 2B generates signals including a carrier, it is necessary to be operated at speed of 4B.

The second problem is that a bandwidth of a receiver is also required to have a wide band. In order to receive the optical current of FIG. 4 and to demodulate a signal, a photoelectric conversion unit is necessary which has a wide band in surplus by the guard band B. In addition, an analog-digital conversion unit (corresponding to the reference numeral 221 of FIG. 11 described later) is also required to have a circuit which is operated at ultra high speed. Generally, an electronic circuit operated at high speed is very expensive, and, in the worst case, that is, in a case where a bit rate to be realized is too high, the circuit is hard to obtain, and thus a system cannot be realized.

One of the solutions to the first problem, that is, the wide band of the optical transmitter (particularly, the digital-analog conversion unit) has been proposed (NPL 1), and this is a method of adding a carrier after generating a base band OFDM signal.

A technique disclosed in NPL 1 is aimed at solving the first problem, that is, preventing the digital-analog conversion unit of the optical transmitter from being operated at high speed. The second problem, that is, the wide band or high speed of the optical receiver, particularly, the photoelectric conversion unit or the analog-digital conversion unit is not solved yet.

The present invention has been made in consideration of the above problems, and an object thereof is to provide an optical communication system, an optical transmitter, and a transponder which can be realized without being influenced by inter-subcarrier beat interference and further without widening of a bandwidth of an optical receiver in an optical OFDM communication system.

Solution to Problem

In the present invention, an optical OFDM signal of different spectra is transmitted alternately for each symbol time of OFDM, and this light is transmitted through an optical fiber and then undergoes photoelectric conversion by a delay interferometer of which a delay time is the same as one symbol time and a balanced direct detection receiver.

Hereinafter, the solutions to the problems will be described more in detail. The drawings are also described in embodiments, and are appropriately referred to below.

The present invention will be described with reference to FIG. 1. In an optical communication system of the present invention, an optical transmitter 100 and an optical receiver 200 are connected via an optical fiber 300. A transmission signal processing unit 110 of the optical transmitter 100 converts communication data which is input from an input end into a base band OFDM signal. Here, a configuration of the transmission signal processing unit is as shown in FIG. 2, for example.

A real part and an imaginary part of the base band OFDM signal are converted into an optical OFDM signal by an electric-optic conversion unit 120 and are transmitted to the optical fiber 300. The optical OFDM signal has two-way spectra shown in FIG. 7, alternately for each OFDM symbol time as shown in FIG. 6.

The optical OFDM signal passing through the optical fiber 300 is incident to the optical receiver 200. The optical receiver 200 includes a delay interferometer 230 of which delay time T is the same as one symbol time of OFDM, a balanced photoelectric conversion unit 210, and a reception signal processing unit 220. The optical OFDM signal which interfered with an optical signal one symbol time ago in the delay interferometer 230 is converted into an electric signal by the balanced photoelectric conversion unit 210, and the electric signal is demodulated to data which is information by the reception signal processing unit 220 and is output.

FIG. 8 shows a configuration of the delay interferometer, FIG. 9 shows a configuration of the balanced photoelectric conversion unit, and FIG. 11 shows a configuration example of the reception signal processing unit.

Next, with the configurations of the optical transmitter and optical receiver, a description will be made that there is no influence of the inter-subcarrier beat interference and a bandwidth of the optical receiver is narrower than the method in the related art. The optical field E(t) of the spectrum of FIG. 7 is represented by the following Expression.

[Expression 1]

$$E(t)=E_C(t)+E_S(t) \quad (1)$$

Here, $E_C(t)$ indicates a field of the carrier, and $E_S(t)$ indicates a field of the OFDM signal. As can be seen from FIG. 7, the optical frequency of the carrier and the optical frequency of the OFDM signal including a plurality of subcarriers are changed alternately for each symbol. The optical field E(t) passes through the optical fiber 300 and is incident to the delay interferometer 230. Optical fields from output ports 1 and 2 of the delay interferometer 230 are respectively represented by the following Expressions.

[Expression 2]

$$E_{port1}(t) \propto E(t)+E(t+T)$$

$$E_{port2}(t) \propto E(t)-E(t+T), \quad (2)$$

Here, T indicates a delay time of the delay interferometer 230, that is, the symbol time of OFDM.

This light is converted into an electric signal by the balanced photoelectric conversion unit 210, and currents which respectively flow through two photodiodes of the balanced photoelectric conversion unit 210 are represented by the following Expression.

[Expression 3]

$$i_1(t) \propto |E_{port1}(t)|^2$$

$$i_2(t) \propto |E_{port2}(t)|^2, \quad (3)$$

As a result, an output V(t) of the balanced photoelectric conversion unit 210 is given by the following Expression.

[Expression 4]

$$V(t) \propto i_1(t) - i_2(t) \propto E(t) \cdot E^*(t+T) + E^*(t) \cdot E(t+T) = E_C(t) \cdot E_C^*(t+T) + E_C^*(t) \cdot E_S(t+T) + E_C^*(t+T) \cdot E_S(t) + E_S(t) \cdot E_S^*(t+T) + cc, \quad (4)$$

The first term of the right side of Expression (4) indicates an inter-carrier beat signal, the second and third terms indicate beat signals (desired signals) of the carrier and the OFDM signal, and the fourth term indicates an inter-OFDM signal beat signal, that is, an inter-subcarrier beat signal.

Here, a description will be made of a case where, in the signal shown in FIG. 6, a symbol at the time point t is the symbol No. 2, and a symbol at the time point t+T is the symbol No. 1. From the spectrum (FIG. 7), a difference between the frequency ($f_{LD1} - f_{S1}$) of the carrier 1 of the symbol No. 1 and the lowest frequency ($f_{LD2} - B/2$) of the OFDM signal of the symbol No. 2 is set as an inter-subcarrier frequency Δf. Similarly, a difference between the frequency ($f_{LD2} + f_{S2}$) of the carrier 2 of the symbol No. 2 and the lowest frequency ($f_{LD1} - B/2$) of the OFDM signal of the symbol No. 1 is set as an inter-subcarrier frequency Δf. Here, B indicates a bandwidth of the OFDM signal. In addition, the frequency width $W_2$ of the guard band is at least B or more.

Under the above conditions, when a spectrum of an output signal (Expression (4)) of the balanced photoelectric conversion unit is calculated, a result thereof is as shown in FIG. 10(a). The signal of the white circle indicates a sum of the OFDM signals S1 and S2 (a sum of the second term and the third term of the right side in Expression (4)), and the signal of the black circle indicates an inter-subcarrier beat signal (the fourth term of the right side in Expression (4)) of the OFDM signals S1 and S2.

Next, when a spectrum is calculated in the same manner for a case where a symbol at the time point t is a symbol No. 3, and a symbol at the time point t+T is the symbol No. 2 in the signal of FIG. 6, a result thereof is as shown in FIG. 10(b).

From FIGS. 10(a) and 10(b), the following two facts can be seen. First, the inter-subcarrier beat signal and the desired signal (this case corresponds to a sum of S1 and S2 or a sum of S2 and S3) are completely divided on the frequency axis, and thus signal degradation due to interference does not occur. In addition, unlike in the method (refer to FIG. 4) in the related art, the desired signal is distributed on the low frequency side of the inter-subcarrier beat signal, and thus an analog reception bandwidth which is a requirement of the optical receiver 200 is a half of the related art, that is, approximately B. As a result, a necessary sampling speed of an analog-digital conversion circuit 221 is also a half of the related art, that is, approximately 2B.

In addition, in the above description, the frequency width $W_2$ of the guard band is the minimum value B in which the inter-subcarrier beat interference does not perfectly occur, but even if signal degradation due to interference is allowable to a certain extent, the following Expression is required to be satisfied.

[Expression 5]

$$W_2 > B/2, \quad (5)$$

An output electric signal of the balanced photoelectric conversion unit 210 enters the reception signal processing unit 220. FIG. 11 is a functional block diagram of the reception signal processing unit 220. The output electric signal of the balanced photoelectric conversion unit 210 is first converted into a digital signal by the analog-digital conversion circuit 221 of the reception signal processing unit 220 (FIG. 11), and then undergoes cyclic prefix removal by a Cyclic Prefix Removal (CPR) portion. This signal is converted into parallel data by a serial-parallel conversion portion 223, and this parallel data is converted into each subcarrier by an FFT portion 224. Since each subcarrier is modulated into data of a sum (in FIG. 10, S1+S2, or S2+S3) of two symbols which precedes and follows each other in time, in order to remove this, a difference operation is performed using a differential amplifier 227 and a delay circuit 228 which delays a signal by one symbol time T. Since the same symbol continuously appears temporally at each symbol time, such as S1+S2, S2+S3, S3+S4, . . . , this is performed for the purpose of conversion such that each symbol appears once at each symbol time through this difference operation, such as S1, S2, S3, S4, . . . . Thereafter, the same process as a reception signal process of an OFDM signal in the related art is performed. That is, a subcarrier demodulation portion demodulates data for each subcarrier, and a parallel-serial conversion portion 226 returns the parallel data to serial data which is output as data.

The above description relates to a basic operation principle of the present invention. It is possible to realize an optical OFDM communication system in which inter-subcarrier beat interference is prevented, and an analog bandwidth of a receiver is a half of the related art, which is the original object of the present invention.

According to the first solving means of the present invention, there is provided an optical communication system comprising:

an optical transmitter that maps digital data to a plurality of subcarriers which are orthogonal to each other over symbol time so as to be modulated and transmitted as an optical signal via an optical fiber; and an optical receiver that performs photoelectric conversion on the optical signal which has propagated through the optical fiber and demodulates each subcarrier signal so as to reproduce original digital data, wherein the optical transmitter includes a transmission signal processing unit that maps digital data to a plurality of subcarriers orthogonal to each other over symbol time so as to be modulated, and generates a base band OFDM signal from the modulated subcarrier signal; and an electric-optic conversion unit that modulates the base band OFDM signal into laser light so as to generate an optical OFDM signal, the transmission signal processing unit and the electric-optic conversion unit transmit optical OFDM signals with alternately different two wavelengths for each symbol time, and the optical receiver includes at least one set of a delay interferometer that delays a portion of the optical OFDM signal received from the optical transmitter via the optical fiber by the symbol time so as to be interfered with the optical OFDM signal and a balanced photoelectric conversion unit that converts the interfered optical signal into an electric signal; and a reception signal processing unit that obtains a subcarrier signal from an output of the photoelectric conversion unit and demodulates data from the subcarrier signal so as to reproduce original digital data.

According to the second solving means of the present invention, there is provided an optical transmitter in an optical communication system comprising the optical transmitter that maps digital data to a plurality of subcarriers which are orthogonal to each other over symbol time so as to be modulated and transmitted as an optical signal via an optical fiber; and an optical receiver that performs photoelectric conversion on the optical signal which has propagated through the optical fiber and demodulates each subcarrier signal so as to reproduce original digital data, the optical transmitter comprising:

a transmission signal processing unit that maps digital data to a plurality of subcarriers orthogonal to each other over symbol time so as to be modulated, and generates a base band OFDM signal from the modulated subcarrier signal; and an electric-optic conversion unit that modulates the base band OFDM signal into laser light so as to generate an optical OFDM signal, wherein the transmission signal processing unit and the electric-optic conversion unit transmit optical OFDM signals with alternately different two wavelengths for each symbol time.

According to the third solving means of the present invention, there is provided a transponder in an optical communication system comprising:

an optical transmitter that maps digital data to a plurality of subcarriers which are orthogonal to each other over symbol time so as to be modulated and transmitted as an optical signal via an optical fiber; and an optical receiver that performs photoelectric conversion on the optical signal which has propagated through the optical fiber and demodulates each subcarrier signal so as to reproduce original digital data, the transponder comprising the optical transmitter and the optical receiver, wherein the optical transmitter includes a transmission signal processing unit that maps digital data to a plurality of subcarriers orthogonal to each other over symbol time so as to be modulated, and generates a base band OFDM signal from the modulated subcarrier signal; and an electric-optic conversion unit that modulates the base band OFDM signal into laser light so as to generate an optical OFDM signal, wherein the transmission signal processing unit and the electric-optic conversion unit transmit optical OFDM signals with alternately different two wavelengths for each symbol time, and the optical receiver includes at least one set of a delay interferometer that delays a portion of the optical OFDM signal received from the optical transmitter via the optical fiber by the symbol time so as to be interfered with the optical OFDM signal and a balanced photoelectric conversion unit that converts the interfered optical signal into an electric signal; and a reception signal processing unit that obtains a subcarrier signal from an output of the photoelectric conversion unit and demodulates data from the subcarrier signal so as to reproduce original digital data.

Advantageous Effects

It is possible, according to the present invention, to provide an optical communication system, an optical transmitter, and a transponder which can be realized without being influenced by inter-subcarrier beat interference and further without widening of a bandwidth of an optical receiver in an optical OFDM communication system.

DESCRIPTION OF EMBODIMENTS

Hereinafter, the present embodiments will be described.

1. First Embodiment

The first embodiment will be described with reference to FIG. 1 and the like. Here, for description, modulation of a subcarrier is assumed as 4-QAM, but the present embodiment is not limited thereto, and any subcarrier modulation method may be employed. In addition, the number of subcarriers is N (where N is an integer).

Figure 1:
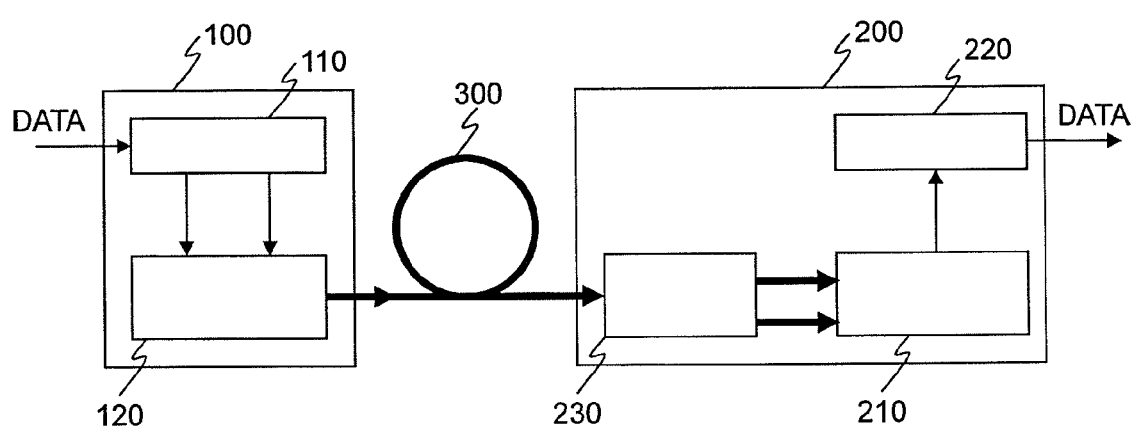
FIG. 1 is a functional block diagram of an optical OFDM communication system of the present invention.

FIG. 1 is a configuration diagram of an optical OFDM communication system according to the present embodiment.

The optical OFDM communication system includes, for example, an optical transmitter 100, an optical fiber 300, and an optical receiver 200. The optical transmitter 100 includes, for example, a transmission signal processing unit 110 and an electric-optic conversion unit 120. The optical receiver 200 includes a delay interferometer 230, a balanced photoelectric conversion unit 210, and a reception signal processing unit 220. The optical transmitter 100 and the optical receiver 200 are connected to each other via the optical fiber 300.

When digital data which should be originally transmitted and received is input to the optical transmitter 100, the data is converted into a base band OFDM signal by the transmission signal processing unit 110 of the optical transmitter 100, and this signal is converted into an optical OFDM signal by the electric-optic conversion unit 120. The optical OFDM signal passes through the optical fiber 300 which is a transmission path and arrives at the direct detection optical receiver 200. The optical OFDM signal is directly detected and is received by the photoelectric conversion unit 210 and is converted into an electric signal. Ideally, the electric signal is the above-described base band OFDM signal, and this signal is demodulated into digital data which should be originally transmitted and received by the reception signal processing unit 220 and is output.

Figure 2:
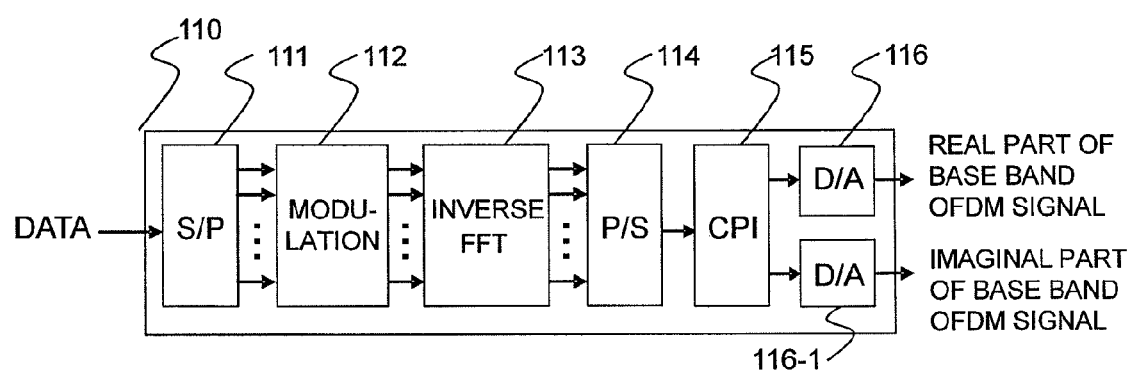
FIG. 2 is a functional block diagram of a transmission signal processing unit.

FIG. 2 is a functional block diagram of the transmission signal processing unit 110 in the first embodiment.

The transmission signal processing unit 110 includes, for example, a serial-parallel (S/P) conversion portion 111, a subcarrier modulation portion 112, an inverse Fast Fourier Transform portion (FFT portion) 113, a parallel-serial (P/S) conversion portion 114, and digital-analog (DA) conversion portions 116 and 116-1. In addition, needless to say, a Cyclic Prefix Insertion (CPI) portion 115 may be provided between the P/S conversion portion 114 and the DA conversion portions 116 and 116-1 so as to add cyclic prefix.

The data which should be originally transmitted and received is converted into 2N parallel data items by the S/P conversion portion ill. Here, N is the number of subcarriers carrying data. In a case where the subcarrier is modulated using 4-QAM, 2N parallel data items are generated, and 4N parallel data items are generated, for example, in a case of 16-QAM. That is, the serial data is converted into "bit number of one symbol x the number of subcarriers" parallel data items. The subcarrier modulation portion 112 modulates the N subcarriers by using the parallel data. The modulated subcarriers ($C_k$, where k=0, 1, . . . , and N−1) are input to the inverse FFT portion 113. The input signal is converted into data of the time axis by the inverse FFT portion (inverse fast Fourier transform portion) 113 and is converted into serial data by the P/S conversion portion 114. A real part and an imaginal part of the serial data respectively pass through the DA conversion portions 116 and 116-1 and are converted into analog signals so as to be output. These output signals are referred to as a base band OFDM signal.

Figure 5:
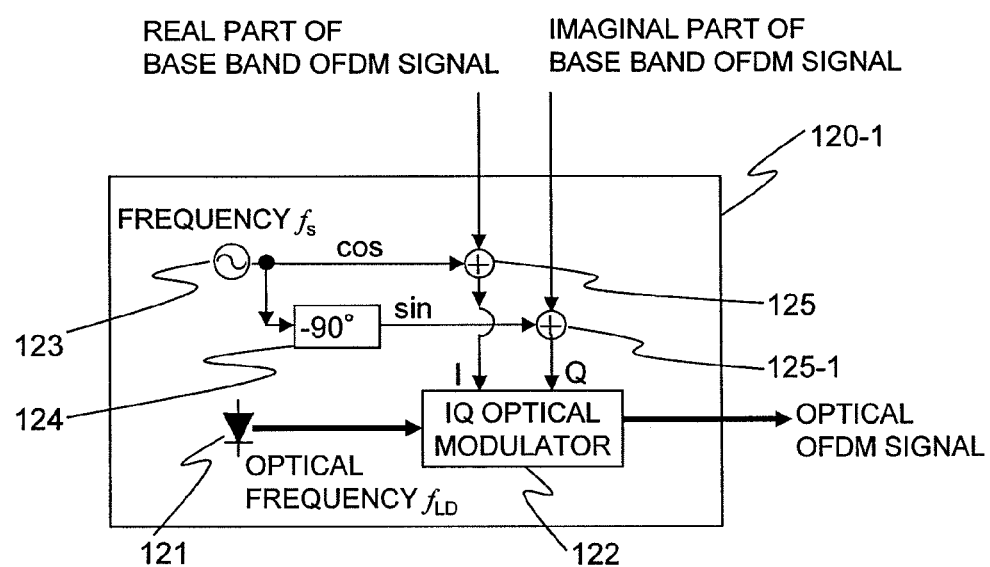
FIG. 5 is an explanatory diagram of a functional block diagram of an electric-optic conversion unit.

Before a configuration and an operation of the electric-optic conversion unit 120 of the present embodiment are described, for better understanding, an example of an electric-optic conversion unit shown in FIG. 5 will be described first. The real part and the imaginal part of the base band OFDM signal which is the output signals of the DA conversion portions 116 and 116-1 of the transmission signal processing unit 110 are respectively added to a cosine wave (cos component) and a sine wave (sin component; a phase of the cosine wave is shifted by 90° and thus may be generated using a phase shifter 124) of an output RF signal (frequency fs) of an RF oscillator 123 by adders 125 and 125-1, and are respectively applied to an I port and a Q port of an IQ optical modulator 122. It is widely known that the IQ optical modulator 122 is, for example, a device which uses an electro-optical effect of an optical wave guide created on a $LiNbO_3$ (Lithium Niobate) substrate, the modulator is not limited thereto and may be a device created on, for example, an InP substrate.

Figure 3:
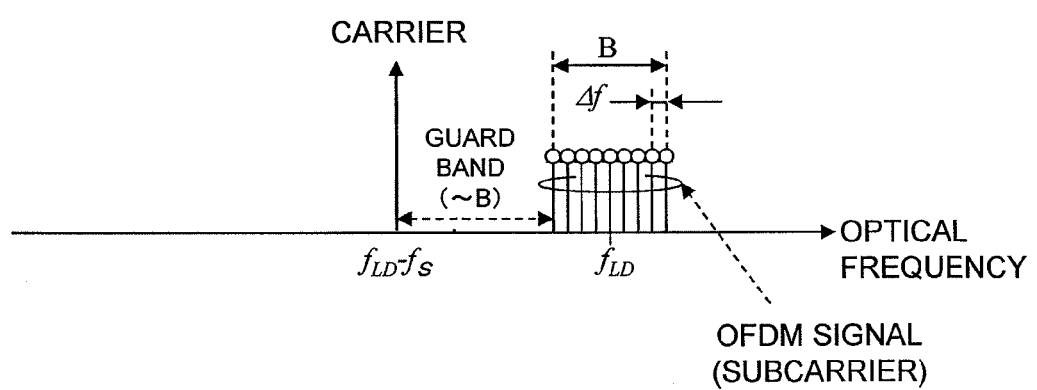
FIG. 3 is a schematic diagram of a spectrum of optical OFDM signal light in an optical OFDM communication system in the related art.

A laser (light source) 121 emits light of an optical frequency $f_{LD}$, and this light is incident to the IQ optical modulator 122. In the IQ optical modulator 122, an I component of this light is modulated with the electric signal which is input to the I port, a Q component of the light is modulated with the electric signal which is input to the Q port, and these two components, that is, the modulated I component and Q component of the light are added to each other and are output. A spectrum of the output light (hereinafter, referred to as an optical OFDM signal) of the IQ optical modulator 122 includes an OFDM signal which is a collection of a plurality of subcarriers and a lower sideband wave component (a frequency is $f_{LD}-f_S$; hereinafter, referred to as a carrier) of the light generated by the RF signal of the frequency $f_S$ with respect to the optical frequency $f_{LD}$ (needless to say, the carrier may be an upper sideband wave component $f_{LD}+f_S$). Here, $f_S$ is set to, for example, W+B/2 when a bandwidth of the base band OFDM signal is B, and a desired guard band width is W. A spectrum of the output light of the IQ optical modulator 122 in this case is as shown in FIG. 3 (WEB in FIG. 3). A configuration and an operation of the electric-optic conversion unit will be described below based on this example.

Figure 12:
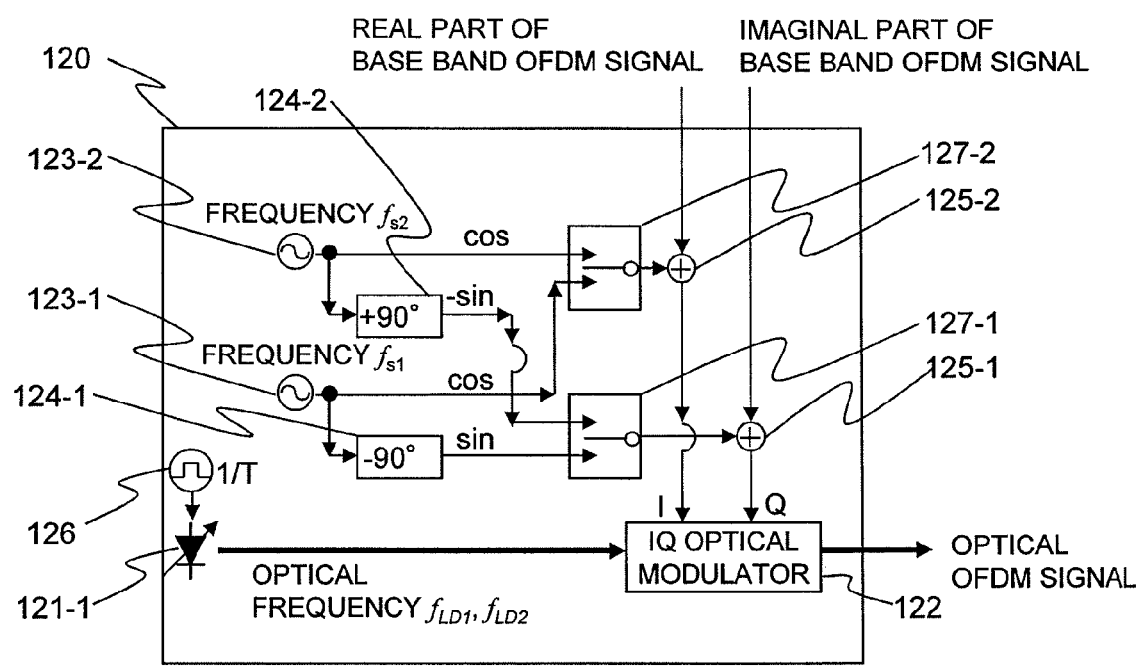
FIG. 12 is a configuration diagram of an electric-optic conversion unit according to the first embodiment of the present invention.

FIG. 12 shows a configuration of the electric-optic conversion unit according to the first embodiment of the present invention.

A basic operation is the same as in the above-described example, that is, the real part and the imaginal part of the base band OFDM signal which is an output of the transmission signal processing unit 110 are respectively added to the cos component and the sin component of the RF signal, and these are applied to the I port and the Q port of the IQ optical modulator 122 and modulate the light from the laser 121-1.

A first difference from the above-described example is that the light from the laser 121-1 is controlled by an RF oscillator 126 so as to alternately have two different optical frequencies $f_{LD1}$ and $f_{LD2}$ for each symbol time of an OFDM signal. For example, the laser 121-1 uses a semiconductor laser, and the switching of the optical frequency can be realized by slightly changing a driving current of the semiconductor laser according to an output signal of the RF oscillator 126. In addition, to what extent a difference $f_{LD1}-f_{LD2}$ (assuming $f_{LD1}>f_{LD2}$) of the two optical frequencies is set will be described later. The present invention is not limited thereto, and a light source portion which generates light of two optical frequencies in other methods may be used.

In addition, there is also a difference from the above-described example in that, in relation to the RF signal added to the real part and the imaginal part of the base band OFDM signal, either one of outputs (respective oscillation frequencies are $f_{S1}$ and $f_{S2}$) of two RF oscillators 123-1 and 123-2 is selected by 2×1 electric switches 127-1 and 127-2. In addition, the sine components of the outputs of the RF oscillators 123-1 and 123-2 are deviated from each other by 180° (that is, out of phase; in addition, the cosine components are in phase). This can be realized by setting values of phase shifters 124-1 and 124-2 to −90° and 90°, respectively. In addition, oscillators which respectively generate a sine component and a cosine component of two frequencies in other methods may be used.

The switching between the 2×1 electric switches 127-1 and 127-2 is performed in synchronization with the symbol time of the OFDM signal. In addition, the switching is synchronized with the conversion (this is controlled by the RF oscillator 126) for each symbol time of the optical frequency of the above-described laser 121-1. Further, the switching for each symbol time is synchronized with the clock of the transmission signal processing unit 110. That is, all of the logic circuits, the oscillators, and the changeover switches of the optical transmitter 100 are synchronized with the same clock.

Figure 6:
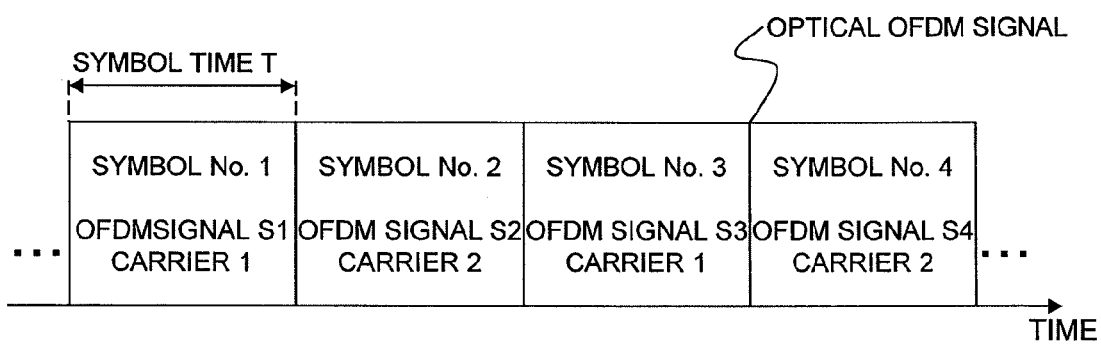
FIG. 6 is a schematic diagram illustrating a time series of an optical OFDM signal in the present invention.

The optical OFDM signal (that is, the output light of the IQ optical modulator 122) at this time may be schematically shown as in FIG. 6. In other words, at a certain symbol (temporarily, referred to as the symbol No. 1), a frequency of the light from the laser 121-1 is $f_{LD1}$, and a frequency of the RF signal added to the base band OFDM signal is $f_{S1}$. At the symbol No. 2 subsequent thereto, a frequency of the light from the laser 121-1 is $f_{LD2}$, and a frequency of the RF signal added to the base band OFDM signal is $f_{S2}$. Further, symbols subsequent thereof, that is, the symbols Nos. 3, 5, . . . use the same optical frequency $f_{LD1}$ and RF signal frequency $f_{S1}$ as the symbol No. 1, and the symbols Nos. 4, 6, . . . use the same optical frequency $f_{LD2}$ and RF signal frequency $f_{S2}$ as the symbol No. 2.

Figure 7:
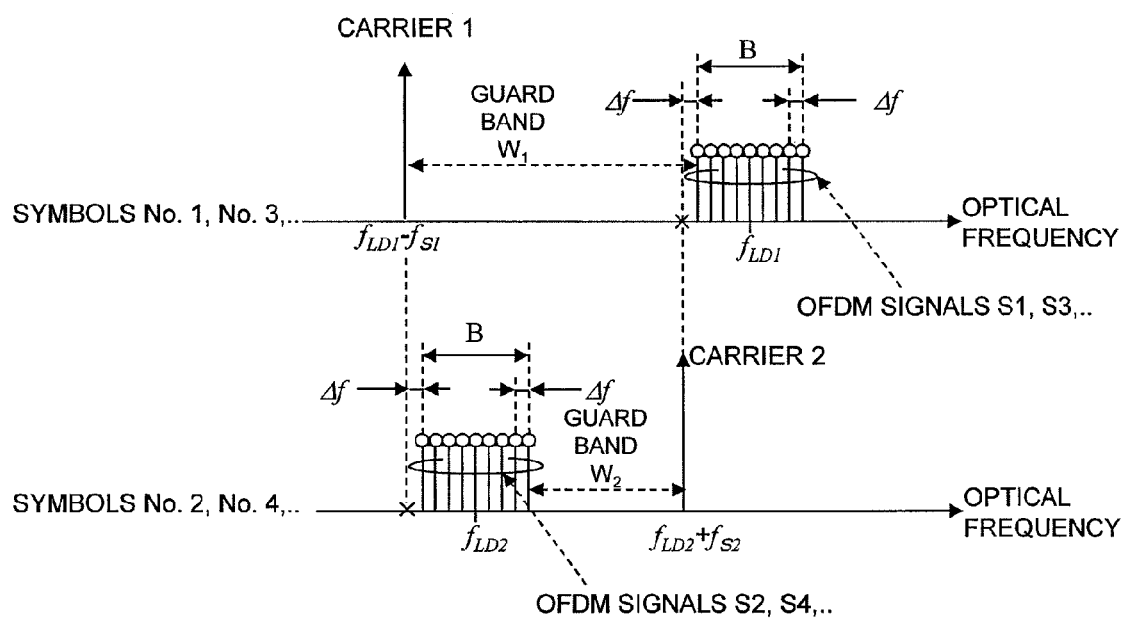
FIG. 7 is a schematic diagram illustrating an example of a spectrum of optical OFDM signal light in the present invention.

In addition, as described above, since the sine components of the two RF signals are out of phase, a carrier at the symbols Nos. 1, 3, 5 . . . , which is generated using the RF signal with the frequency $f_{S1}$, is a lower sideband wave, and a carrier at the symbols Nos. 2, 4, 6 . . . , which is generated using the RF signal with the frequency $f_{S2}$, is an upper sideband wave. Further, if the frequencies $f_{S1}$ and $f_{S2}$ of the RF signals are set to different values, for example, as described later, a spectrum of the optical OFDM signal may be as shown in FIG. 7. The figure on the upper part of FIG. 7 shows a spectrum at the time of the symbols Nos. 1, 3, 5, . . . , and the figure on the lower part of FIG. 7 shows a spectrum at the time of the symbols Nos. 2, 4, 6, . . . .

The frequencies $f_{S1}$ and $f_{S2}$ of the RF signals which are outputs of the RF oscillators 123-1 and 123-2 are determined, for example, as follows. In other words, when bandwidths of the guard bands are $W_1$ and $W_2$, and a bandwidth of the OFDM signal is B, the following Expression is given (refer to FIG. 7).

[Expression 6]

$$f_{S1} = W_1 + \frac{B}{2}$$
$$f_{S2} = W_2 + \frac{B}{2}. \tag{6}$$

The bandwidths $W_1$ and $W_2$ of the guard bands are required to be set to be as small as possible in order to increase spectral use efficiency of light but are required to be set to be large in order to prevent interference due to an inter-subcarrier beat signal occurring during direct detection.

When the interference due to the inter-subcarrier beat signal is completely prevented (a case of FIG. 10), the minimum values of the bandwidths $W_1$ and $W_2$ of the guard bands are respectively approximately 2B and B. More accurately, the following Expression is required to be satisfied.

[Expression 7]

$$W_1 \geq W_2 + B + 2 \cdot \Delta f$$
$$W_2 \geq B, \tag{7}$$

Here, $\Delta f$ indicates a frequency interval between subcarriers, and has the following relationship.

[Expression 8]

$$B = (N-1) \cdot \Delta f, \tag{8}$$

However, the optical frequency difference $f_{LD1} - f_{LD2}$ of the laser is given by the following Expression from FIG. 7 and Expression (7).

[Expression 9]

$$f_{LD1} - f_{LD2} = B + W_2 + \Delta f \geq 2B + \Delta f, \tag{9}$$

In addition, when interference due to the inter-subcarrier beat signal is not completely prevented, that is, signal quality degradation due to the inter-subcarrier beat interference is allowed to a certain extent, the bandwidths $W_1$ and $W_2$ of the guard bands are required to respectively have at least approximately 3B/2 or more and B/2 or more. In this case, in the received OFDM signal, subcarriers (about a half of the overall subcarriers) on the high frequency side are influenced by the inter-subcarrier beat interference, and subcarriers on the low frequency side corresponding to the remaining half are not influenced by the inter-subcarrier beat interference and are thus in a state in which there is no received signal quality degradation.

In the description of the present embodiment, a case where both conditions regarding the minimum values of Expressions (6) and (7) are satisfied, that is, a case where interference due to the inter-subcarrier beat signal is completely prevented will be continuously described below. A spectrum in this case is as shown in FIG. 7. In other words, a frequency interval between the carrier 1 at the symbols Nos. 1, 3, . . . and the subcarrier on the lowest frequency side of the OFDM signal at the symbols Nos. 2, 4, . . . is $\Delta f$. Similarly, a frequency interval between the carrier 2 at the symbols Nos. 2, 4, . . . and the subcarrier on the lowest frequency side of the OFDM signal at the symbols Nos. 1, 3, . . . is $\Delta f$.

The optical OFDM signal generated by the above-described electric-optic conversion unit 120 propagates through the optical fiber 300 which is a transmission path as transmission light of the optical transmitter 100 and arrives at the optical receiver 200. The light is first incident to the delay interferometer 230 in the optical receiver 200.

Figure 8:
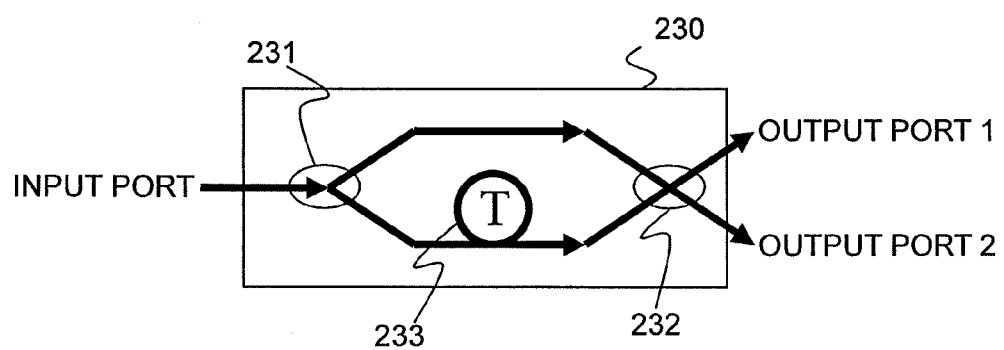
FIG. 8 is a configuration diagram of a delay interferometer.

FIG. 8 shows a structure of the delay interferometer 230. The light which is incident from an input port of the delay interferometer 230 is split into two light beams by an optical coupler 231, and one of them is delayed in a delay time portion 233 by one symbol time T of OFDM, is combined with the other split light beam in an optical coupler 232, and is output from an output port 1 and an output port 2.

Figure 9:
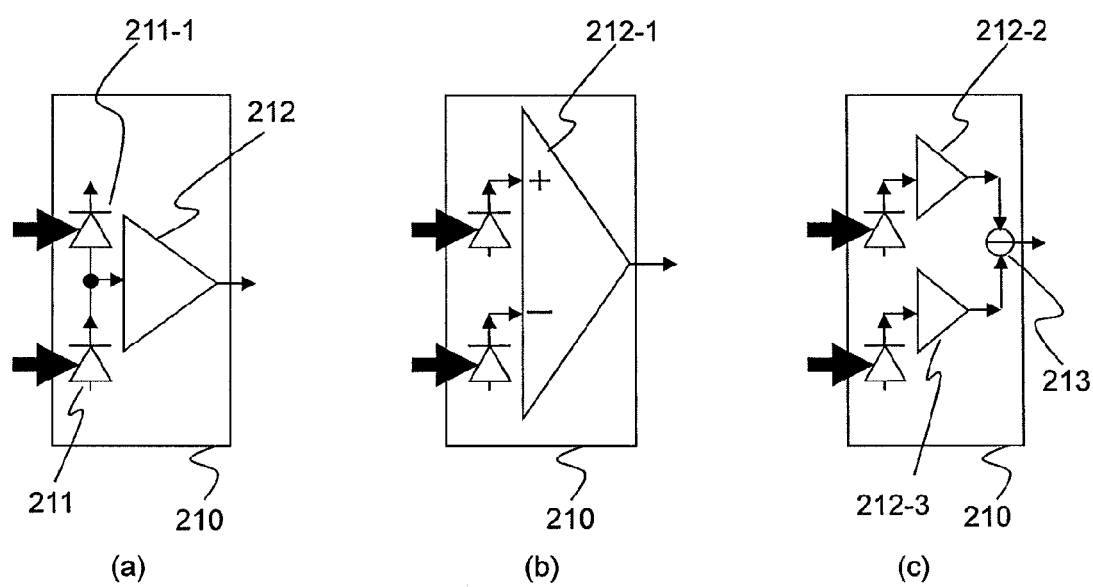
FIG. 9 is a configuration diagram of a balanced photoelectric conversion unit.

FIG. 9 shows a specific configuration of the balanced photoelectric conversion unit 210. The light beams from the two output ports of the delay interferometer 230 are converted into an electric signal by the balanced photoelectric conversion unit 210. The balanced photoelectric conversion unit includes, for example, two photodiodes and a pre-amplifier, and two signals which are converted from the light beams into currents by the photodiodes are subtracted from each other so as to be output from the balanced photoelectric conversion unit 210.

Figure 10:
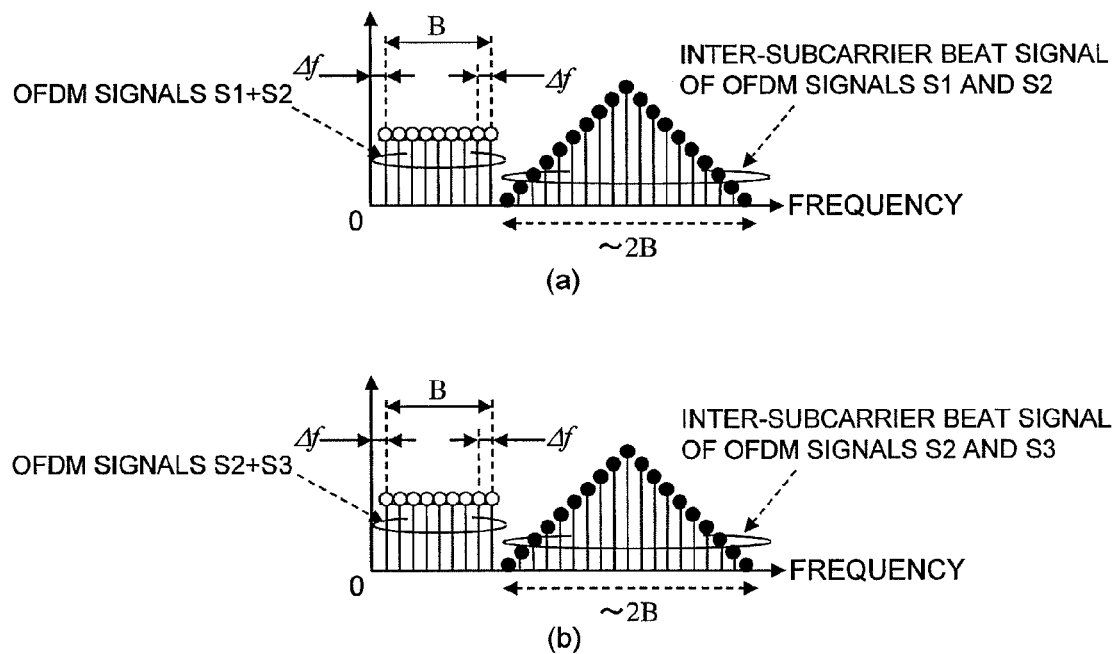
FIG. 10 is a schematic diagram illustrating an example of a spectrum of a received electric signal in the present invention.

FIG. 10 shows a spectrum of the output signal of the balanced photoelectric conversion unit 210. FIG. 10(*a*) shows a spectrum in a case where the symbol No. 1 and the symbol No. 2 of the optical OFDM signals of FIG. 6 are combined by the delay interferometer 230, and FIG. 10(*b*) shows a spectrum in a case where the symbol No. 2 and the symbol No. 3 of the optical OFDM signals of FIG. 6 are combined by the delay interferometer 230. FIG. 10 shows a case of an optical OFDM signal in which both conditions regarding the minimum values of Expressions (6) and (7) are satisfied.

Figure 4:
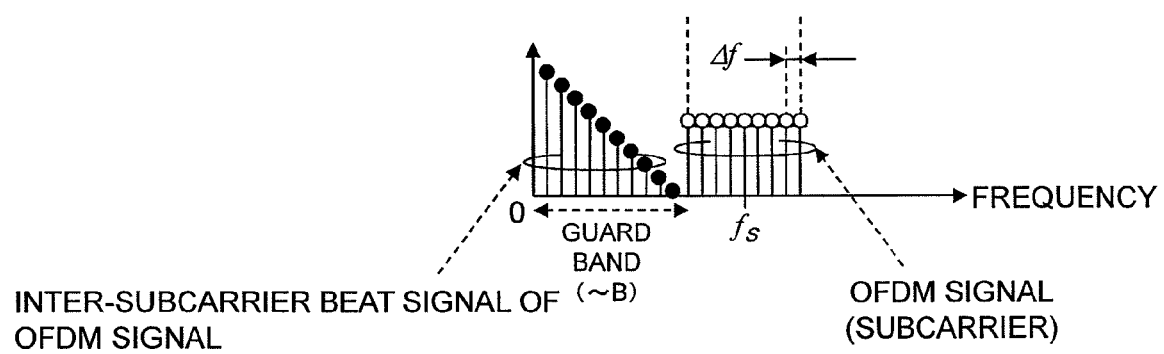
FIG. 4 is a schematic diagram of a spectrum of a received electric signal in the optical OFDM communication system in the related art.

It can be seen from FIG. 10 that sums (S1+S2, S2+S3, . . . ) of the OFDM signals which should be received are obtained on the low frequency side, and inter-subcarrier beat signals at different symbol times are obtained on the high frequency side. If both of the conditions of Expressions (6) and (7) are satisfied, the OFDM signal and the inter-subcarrier beat signal can be completely divided on the spectrum. In addition, since the desired OFDM signal appears on the low frequency side and the unnecessary inter-subcarrier beat signal appears on the high frequency side unlike in the method (refer to FIG. 4) in the related art, bandwidths, which are necessary for the analog parts of the optical receiver 200, for example, the photodiodes, the pre-amplifiers, and the AD converters, may be approximately the bandwidth B of the OFDM signal.

Figure 11:
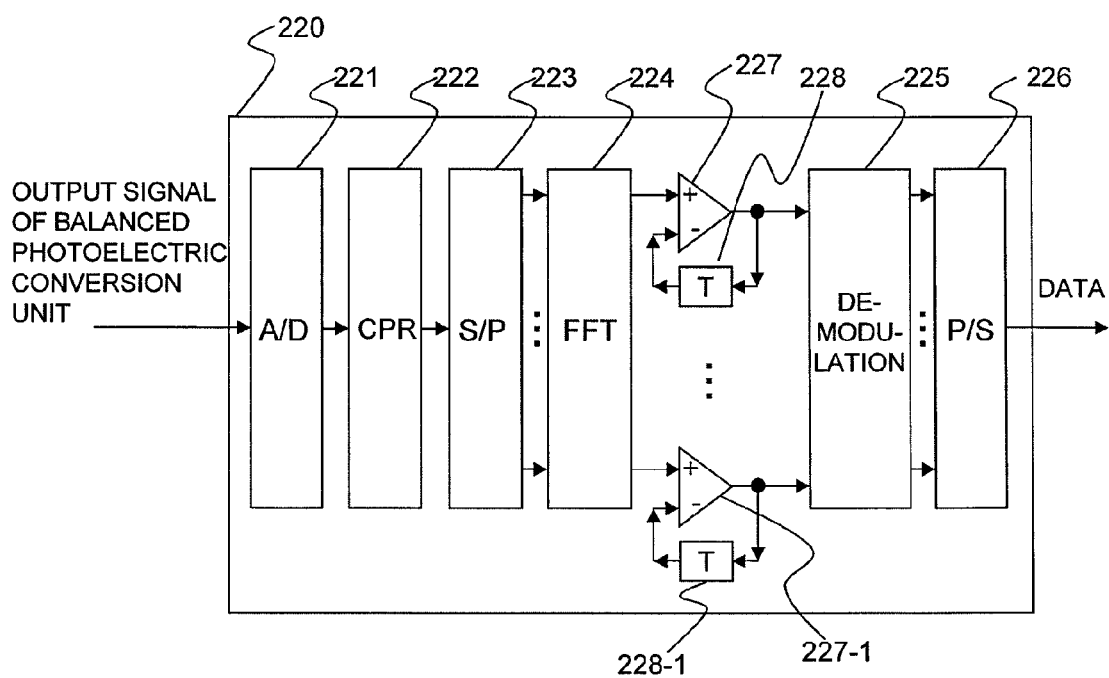
FIG. 11 is a functional block diagram of a reception signal processing unit according to a first embodiment of the present invention.

FIG. 11 shows a functional block diagram of the reception signal processing unit 220. The output signal of the balanced photoelectric conversion unit 210 is input to the reception signal processing unit 220. An output signal of the photoelectric conversion unit 210-1 is digitalized by the analog-digital (AD) conversion circuit 221, undergoes cyclic prefix removal by the Cyclic Prefix Removal (CRP) portion 222, and is converted into N parallel data items by the serial-parallel (S/P) conversion portion 223. The parallel data items are divided into N subcarrier signals in the Fast Fourier Transform (FFT) portion 224. Thereafter, data carried on each subcarrier is demodulated by the subcarrier demodulation portion 225, and is converted into serial data by the parallel-serial (P/S) conversion portion 226 so as to be output as reception information data.

In the reception signal processing unit 220 according to the present embodiment, a signal which is divided into subcarriers by the FFT portion 224, takes a difference from a signal which was input one symbol ago, and is sent to the demodulation portion 225 on the next stage. Specifically, the respective subcarriers of the output of the FFT portion 224 are input to the differential amplifiers 227 and 227-1. The outputs of the differential amplifiers are delayed by one symbol time T of OFDM in the delay circuits 228 and 228-1 and are connected to the other inputs of the differential amplifiers 227 and 227-1. Therefore, a difference between a signal of the current symbol and a signal which was input one symbol time ago is output from each of the differential amplifiers 227 and 227-1.

As described with reference to FIG. 10, since a received subcarrier signal is a sum of two continuous symbols by the function of the delay interferometer 230, signals (S1, S2, S3, . . . ) of the respective symbols are obtained as outputs of the differential amplifiers when the delay circuits and the differential amplifiers are used for each subcarrier.

The outputs of the differential amplifiers 227 and 227-1 are demodulated by the subcarrier demodulation portion 225 as described above, and are converted into serial data by the following parallel-serial conversion portion 226 so as to be output as an output signal of the optical receiver 200. This signal is received data.

2. Second Embodiment

The second embodiment will be described with reference to FIG. 13. An electric-optic conversion unit 120 of the present embodiment is different from that of the first embodiment, and the other parts are the same as in the first embodiment, and thus description thereof will be omitted.

Figure 13:
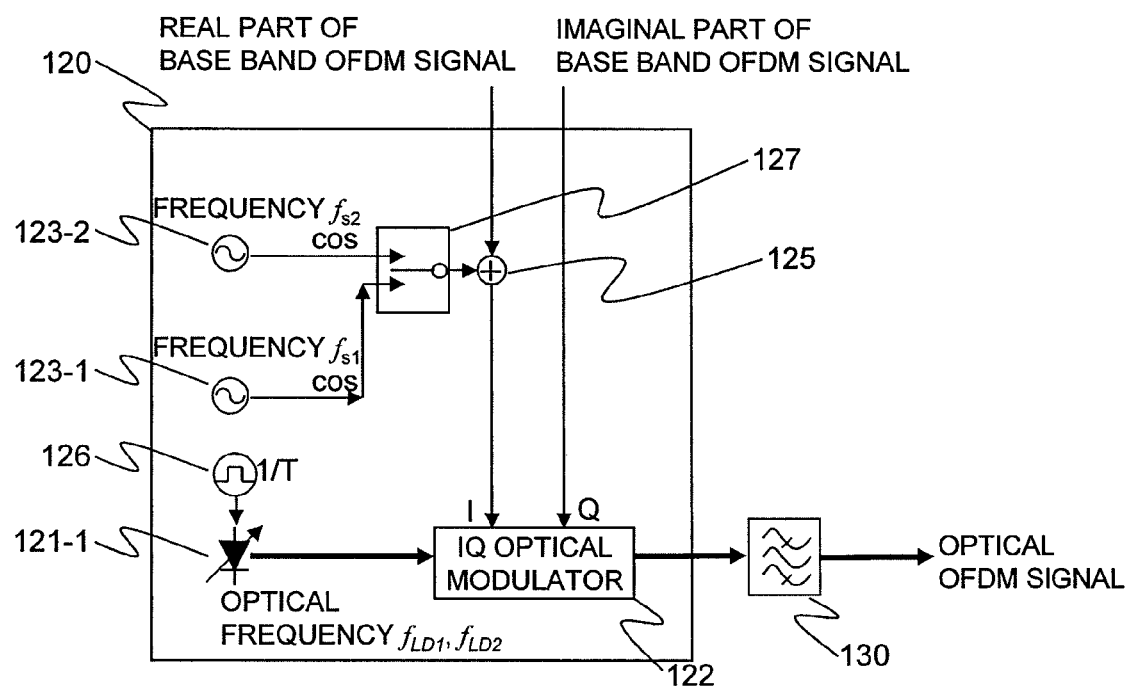
FIG. 13 is a configuration diagram of an electric-optic conversion unit according to a second embodiment of the present invention.

FIG. 13 is a diagram illustrating a functional block of the electric-optic conversion unit 120 and an optical filter 130 according to the second embodiment.

A real part of the base band OFDM signal which is an output of the transmission signal processing unit 110 is added to a cosine wave (COS) which is an output of the RF oscillator 123-1 of the frequency $f_{S1}$ or the RF oscillator 123-2 of the frequency $f_{S2}$ selected by the 2×1 switch 127 in the adder 125, and is applied to the I port of the IQ optical modulator 122. On the other hand, an imaginal part of the base band OFDM signal is applied to the Q port of the IQ optical modulator 122 without being added. Light which is incident to the IQ optical modulator 122 is light of which a frequency is alternately changed to $f_{LD1}$ and $f_{LD2}$ for each OFDM symbol time, and this light is light emitted from the laser 121-1. For example, the laser 121-1 uses a semiconductor laser, and, in this case, the frequency of the light can switch between $f_{LD1}$ and $f_{LD2}$ by slightly changing a driving current of the semiconductor laser according to an output of the RF oscillator 126 for each OFDM symbol time.

In addition, both the switching timing of the 2×1 switch 127 and the switching (this is controlled by the RF oscillator 126) of the frequency of the light from the laser are performed in synchronization with the symbol time of the OFDM signal. Further, the switching for each symbol time is synchronized with the clock of the transmission signal processing unit 110. That is, all of the logic circuits, the oscillators, and the changeover switches of the optical transmitter 100 are synchronized with the same clock.

However, in the electric-optic conversion unit 120 of the present embodiment, in the same manner as the electric-optic conversion unit of the first embodiment, the RF signal (a frequency is $f_{S1}$ or $f_{S2}$) and a frequency ($f_{LD1}$ and $f_{LD2}$) of the light are changed for each OFDM symbol time. A relationship between the RF signal, the frequency of the light, and the bandwidths $W_1$ and $W_2$ of the guard bands is the same as in the first embodiment.

A difference from the first embodiment is that, since the RF signal (a frequency is $f_{S1}$ or $f_{S2}$) is applied to only the I port of the IQ optical modulator, an OFDM signal including a plurality of subcarriers and carriers generated by the RF signal are present on the high frequency side and the low frequency side thereof in a spectrum of the output light of the electric-optic conversion unit 120 (in the first embodiment, a carrier appears on either the high frequency side or the low frequency side of the OFDM signal; refer to FIG. 7).

Figure 14:
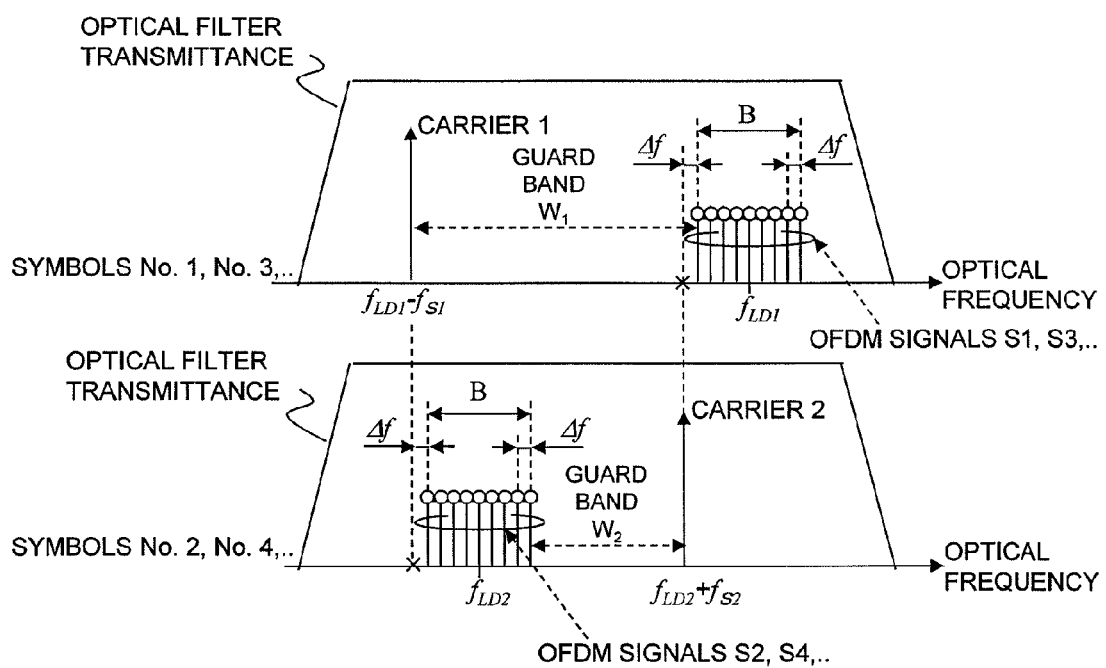
FIG. 14 is a schematic diagram of a spectrum illustrating a transmittance of an optical filter which is used along with a second electric-optic conversion unit of the present invention.

The light from the electric-optic conversion unit 120 of the present embodiment passes through the optical filter 130. FIG. 14 shows a transmittance of the optical filter 130 and a spectrum of the output light of the optical filter 130. The optical filter is a band-pass filter, and is installed so as to cut off one of the carriers (frequencies $f_{LD1} \pm f_{S1}$ and $f_{LD2} \pm f_{S2}$) present on both sides of the OFDM signal. For example, at least the frequency $f_{LD1}+f_{S1}$ (in FIG. 14, a carrier (not shown) appearing on the high frequency side of the OFDM signal in the upper figure) and the frequency $f_{LD2}-f_{S2}$ (in FIG. 14, a carrier (not shown) appearing on the low frequency side of the OFDM signal in the lower figure) are cut off. As a result, as shown in FIG. 14, the spectrum of the output light of the optical filter 130 includes the carrier (a frequency $f_{LD1}-f_{S1}$) on the low frequency side and the OFDM signals S1, S3, . . . at the time of the OFDM symbols No. 1, No. 3, . . . , and the carrier (a frequency $f_{LD2}+f_{S2}$) on the high frequency side and the OFDM signals S2, S4, . . . at the time of the OFDM symbols No. 2, No. 4, . . . .

In addition, the optical filter 130 may be implemented, for example, by an optical filter formed of a dielectric multi-layer film, an optical interleaver formed of an optical wave guide, or the like. Further, in a case of a wavelength multiplexing system, this optical filter may be implemented by mounting an optical filter in each optical transmitter 100 and by using a so-called wavelength multiplexer which wavelength-multiplexes output light of each optical transmitter 100. In this case, the wavelength multiplexer may be implemented using a so-called Arrayed Waveguide Grating (AWG).

Here, as is clear from the description of the present embodiment, the OFDM signal in the optical fiber which is a transmission path, that is, the output light of the optical filter 130 is the same as the light in the first embodiment. Therefore, a configuration of the optical receiver 200 and functions of the respective units thereof are the same as those of the first embodiments, and detailed description thereof will be omitted.

The above description relates to the second embodiment. In addition, as one of features of the present embodiment, a configuration of the transmitter is simpler than that of the first embodiment.

3. Third Embodiment

The third embodiment will be described with reference to FIGS. 15 to 18.

In the present embodiment, a base band OFDM signal is added to an RF signal through a digital signal process.

In the same manner as in the first embodiment, the optical transmitter 100 is connected to the optical receiver 200 via the optical fiber 300 which is a transmission path.

Figure 15:
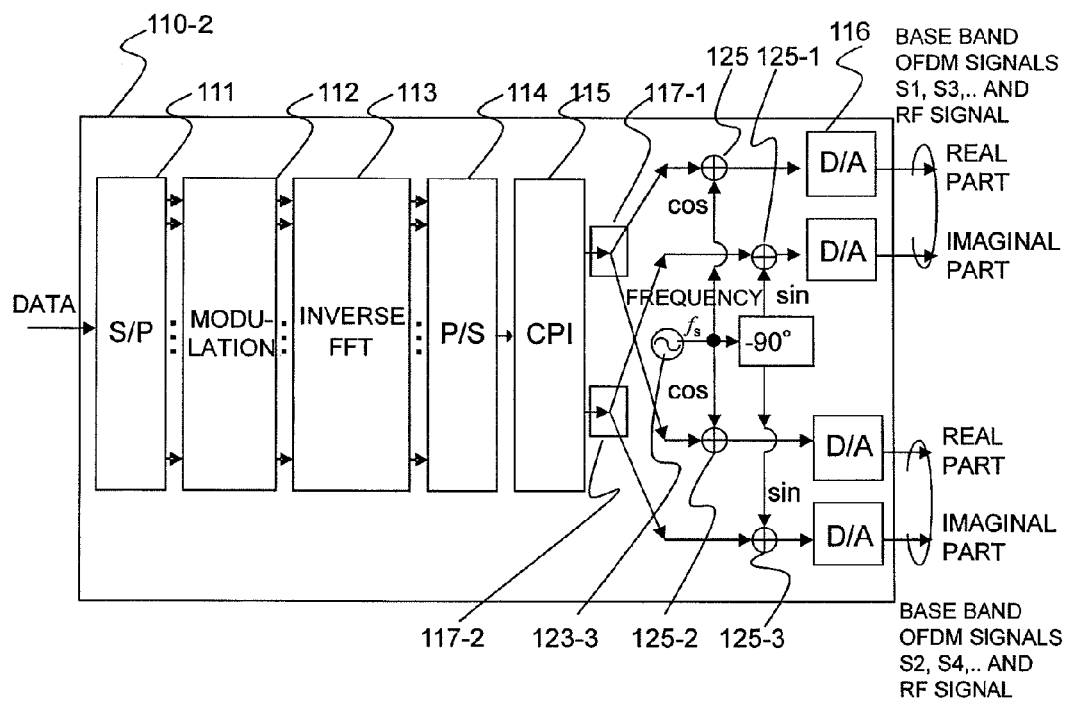
FIG. 15 is a functional block diagram of a transmission signal processing unit according to a third embodiment of the present invention.

FIG. 15 is a functional block diagram of a transmission signal processing unit 110-2. In the optical transmitter 100, data which should be transmitted is converted into a base band OFDM signal by the transmission signal processing unit 110-2. The digital data which should be transmitted undergoes a signal process in the same manner as in the first embodiment or the second embodiment, and is output from the cyclic prefix insertion portion 115. This output corresponds to a real part and an imaginal part of the base band OFDM signal. This output passes through 1×2 electric switches 117-1 and 117-2. Each of the 1×2 electric switches 117-1 and 117-2 alternately changes two outputs for each OFDM symbol time T. The switching timing of the switches is synchronized with switching of OFDM symbols. Therefore, outputs of the OFDM symbols No. 1, No. 3, . . . are different from outputs of the OFDM symbols No. 2, No. 4, . . . . Among the outputs, the real part of the base band OFDM signal is added to a cosine wave (cos) output of the RF oscillator 123-3 of a frequency $f_S$ in the transmission signal processing unit by the adders 125 and 125-2, and the imaginal part of the OFDM signal is added to a sine wave (sin) output of the RF oscillator 123-3 by the adders 125-1 and 125-3. The base band OFDM signal to which the RF signal is added is output to four digital-analog (AD) circuits 116. In addition, the frequency $f_S$ of the RF oscillator 123-3 is set as:

$$f_S = B/2 + \Delta f \qquad (10).$$

This setting allows a spectral width to be minimized. Here, B indicates a bandwidth of the base band OFDM signal, and $\Delta f$ is a frequency interval of the subcarriers.

There are methods of adding the base band OFDM signal to the RF signal in addition to FIG. 15. For example, there may be a method in which an RF frequency port necessary for an input of the inverse FFT portion 113 of FIG. 15 is added to a zero padding port, and inverse FFT transform is performed.

Figure 16:
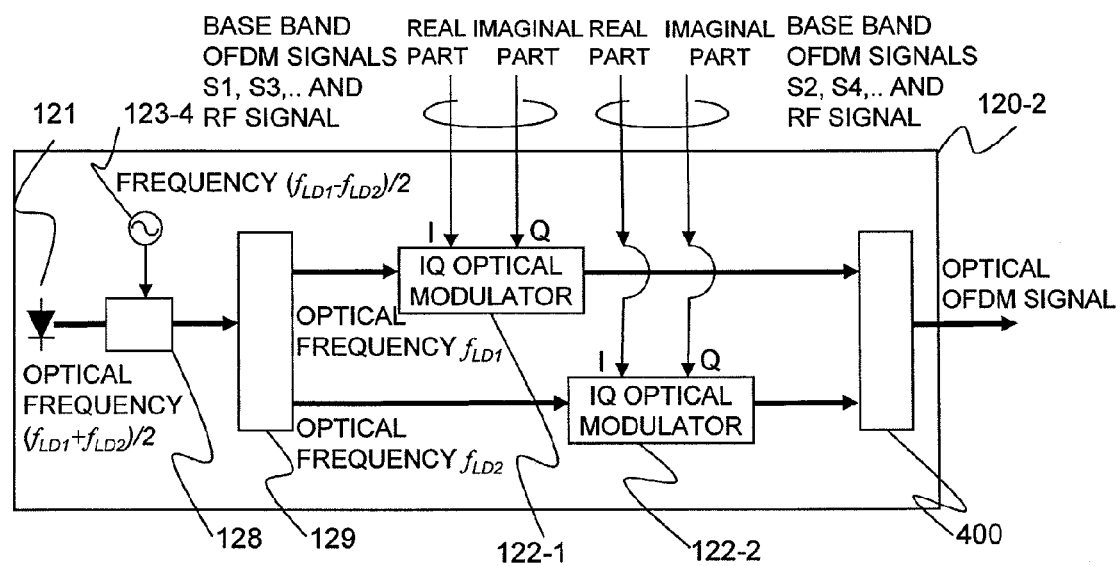
FIG. 16 is a configuration diagram of an electric-optic conversion unit according to the third embodiment of the present invention.

Here, the four output signals (the real part and the imaginal part of the sum of the base band OFDM signals S1, S3, . . . and the RF signal, and the real part and the imaginal part of the sum of the base band OFDM signals S2, S4, . . . and the RF signal) of the transmission signal processing unit 110-2 are guided to the electric-optic conversion unit 120-2 of FIG. 16.

The electric-optic conversion unit 120-2 includes a laser 121 which oscillates at a fixed wavelength, a Mach-Zehnder optical modulator 128 which modulates light of the laser, an RF oscillator 123-4 which drives the modulator, an optical filter 129 which wavelength-demultiplexes light output from the optical modulator 128, two IQ optical modulators 122-1 and 122-2 which respectively modulate two light beams which are wavelength-demultiplexed, and an optical filter 400 which wavelength-multiplexes the outputs therefrom.

Figure 17:
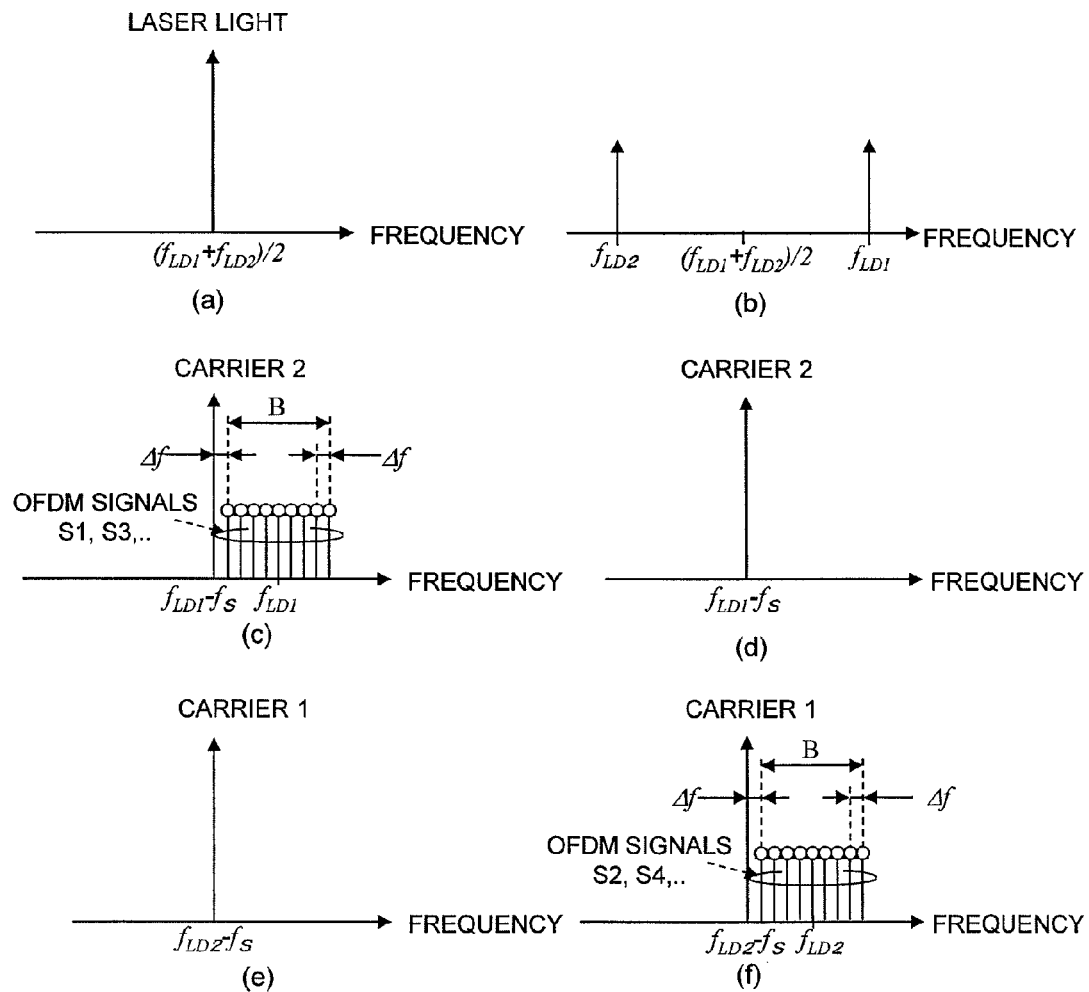
FIG. 17 is a schematic diagram of an optical spectrum of respective portions of the electric-optic conversion unit according to the third embodiment of the present invention.

Next, an operation of the electric-optic conversion unit 120-2 will be described with reference to FIG. 17. An oscillation frequency of the laser 121 is set to $(f_{LD1}+f_{LD2})/2$ (refer to FIG. 17(a)). As the laser 121, a typical semiconductor laser is used. Emission light of the laser 121 is incident to the Mach-Zehnder optical modulator 128. The Mach-Zehnder optical modulator 128 has a bias point which is set to an extinction point of the transmittance, and uses a sine wave output of the RF oscillator 123-4 of the frequency $(f_{LD1}-f_{LD2})/2$ as a driving signal. At this time, a spectrum of the output light of the Mach-Zehnder optical modulator 128 is as shown in FIG. 17(b). In other words, this light has two spectral components (the frequencies $f_{LD1}$ and $f_{LD2}$). This light is incident to the optical filter 129. The optical filter 129 splits the two spectral components included in the output light of the Mach-Zehnder optical modulator 128 so as to be emitted to two output ports. As the optical filter 129, a so-called optical interleaver is put into practical use. In addition, the optical frequency $f_{LD1}-f_{LD2}$ is set according to Expression (9) (assuming $f_{LD1}>f_{LD2}$).

The two outputs of the optical filter 129 are light of the frequency $f_{LD1}$ and light of the frequency $f_{LD2}$. These light beams are modulated by the IQ optical modulators 122-1 and 122-2 and are output.

A driving signal of the IQ optical modulator 122-1 is a sum signal of the base band OFDM signals S1, S3, . . . and the RF signal (a frequency $f_S$). Similarly, a driving signal of the IQ optical modulator 122-2 is a sum signal of the base band OFDM signals S2, S4, . . . and the RF signal (a frequency $f_S$). The driving signals are alternately input to the IQ optical modulators 122-1 and 122-2 for each symbol time by switching the electric switches 117-1 and 117-2 for each symbol time. In addition, the driving signals may be alternately input to the IQ optical modulators by using appropriate methods other than the electric switches 117-1 and 117-2.

Spectra of the output light of the IQ optical modulators 122-1 and 122-2 which are driven with these signals are shown in FIG. 17(c) to FIG. 17(f). In other words, FIG. 17(c)

shows a spectrum of the output light of the IQ optical modulator 122-1 when the OFDM symbols are No. 1, No. 3, . . . , FIG. 17(d) shows a spectrum of the output light of the IQ optical modulator 122-1 when the OFDM symbols are No. 2, No. 4, . . . , FIG. 17(e) shows a spectrum of the output light of the IQ optical modulator 122-2 when the OFDM symbols are No. 1, No. 3, . . . , and FIG. 17(f) shows a spectrum of the output light of the IQ optical modulator 122-2 when the OFDM symbols are No. 2, No. 4, . . . . Here, a case where Expression (10) is established is shown.

The output light beams of the two IQ optical modulators 122-1 and 122-2 are wavelength-multiplexed by the optical filter 400, and this light is transmitted to the optical fiber 300 which is a transmission path as output light of the optical transmitter 100.

The optical filter 400 may be an optical interleaver in the same manner as the optical filter 129, or may be a simple optical coupler.

The optical signal which has propagated through the optical fiber 300 is incident to the optical receiver 200. The optical receiver is the optical receiver 200 used in the first embodiment or the second embodiment.

The above description relates to the third embodiment.

Figure 18:
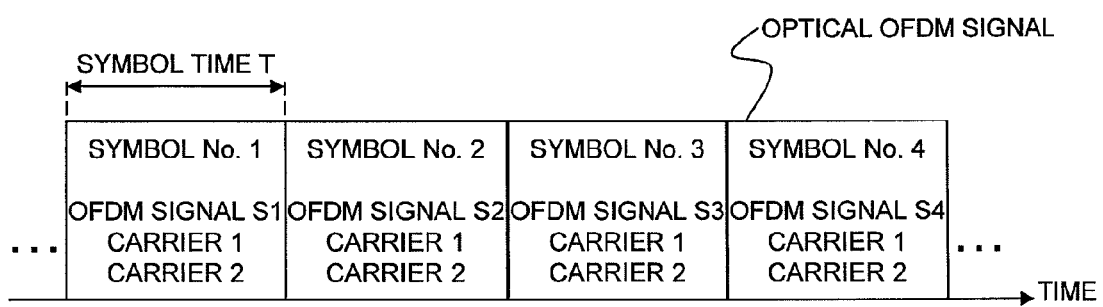
FIG. 18 is a schematic diagram illustrating a time series of an optical OFDM signal according to the third embodiment of the present invention.
Figure 19:
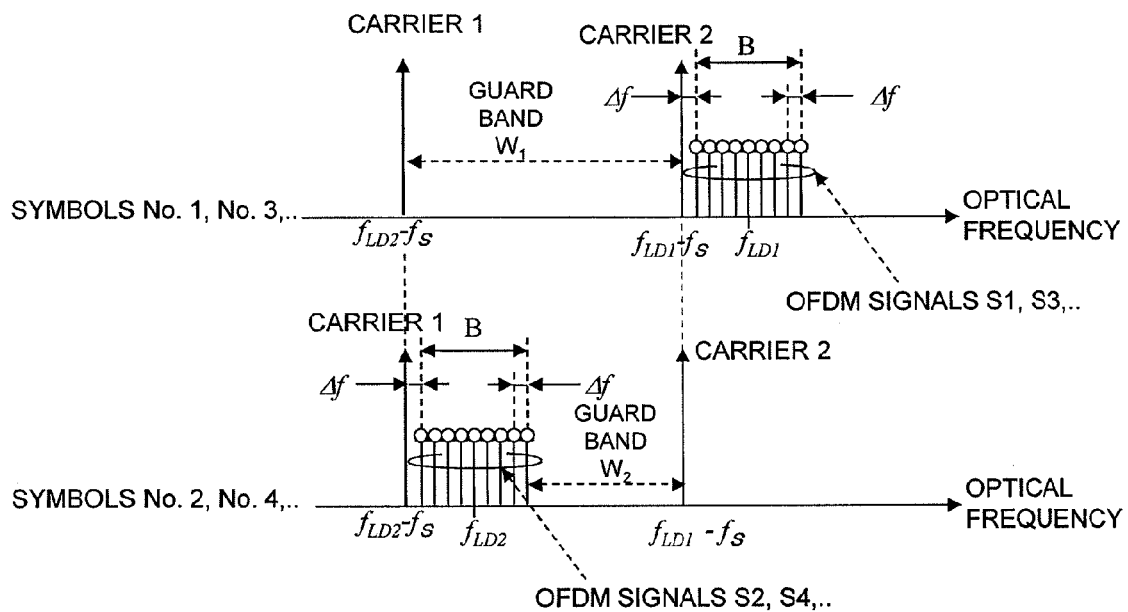
FIG. 19 is a schematic diagram illustrating a spectrum of optical OFDM signal light according to the third embodiment of the present invention.

In addition, a spectrum of the output light of the optical filter 400 in the present embodiment, that is, the output light of the optical transmitter 100 is as shown in FIG. 19. Upon comparison between FIG. 19 and FIG. 7, it can be seen that the number of carriers increases in the spectrum of the present embodiment. In other words, the carriers are a carrier 2 at the time points of the symbols No. 1, No. 3, . . . and a carrier 1 at the time points of the symbols No. 2, No. 4, . . . . These extra carriers generate unnecessary signals in the optical receiver, that is, beat signals of the carrier 2 at the time points of the symbols No. 1, No. 3, . . . and the OFDM signals S2, S4, . . . at the time points of the symbols No. 2, No. 4, . . . , and beat signals of the carrier 1 at the time points of the symbols No. 2, No. 4, . . . and the OFDM signals S1, S3, . . . at the time points of the symbols No. 1, No. 3, . . . . However, when these signals are compared with signals which are originally desired to be received, that is, beat signals of the carrier 1 at the time points of the symbols No. 1, No. 3, . . . and the OFDM signals S2, S4, . . . at the time points of the symbols No. 2, No. 4, . . . , and beat signals of the carrier 2 at the time points of the symbols No. 2, No. 4, . . . and the OFDM signals S1, S3, . . . at the time points of the symbols No. 1, No. 3, . . . , the signals are present on the high frequency side due to the presence of the frequency width $W_2$ of the guard band. Therefore, when the guard band $W_2$ is set to be equal to or more than the OFDM signal bandwidth B (refer to Expression (7)), these signals can be divided from signals which are originally desired to be received on the spectrum, and there is no problem in reception. FIG. 18 schematically shows the output light of the optical filter 400 on the time axis. As described above, each OFDM symbol includes the base band OFDM signal and two carriers. A difference from the output (refer to FIG. 6) of the optical transmitter 100 of the first and second embodiments is that two carriers are present at each OFDM symbol at all times.

As an advantage unique to the present embodiment, since the addition of the RF signal is digitally performed by the transmission signal processing unit 110-2, there is no need to provide a physical RF oscillator, an adder, or an electric switch which is operated at high speed in the optical transmitter 100, and thus a system can be realized at a low cost. In addition, there is no necessity to perform synchronous switching using a plurality of electric switches unlike in the first or second embodiment, and therefore control becomes simple.

4. Fourth Embodiment

The fourth embodiment will be described below with reference to FIG. 20 and the like. Output light of the optical transmitter 100 of the first, the second or the third embodiment propagates through the optical fiber 300 which is a transmission path and is incident to the optical receiver 200.

Figure 20:
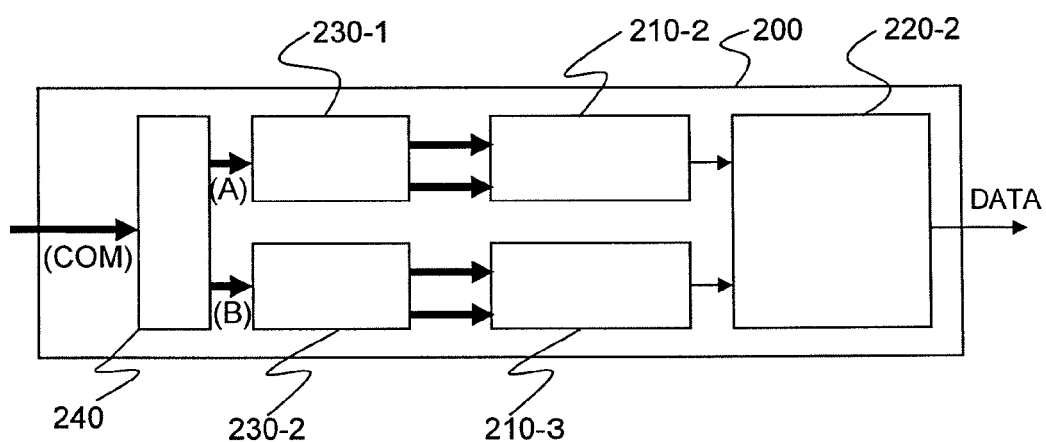
FIG. 20 is a functional block diagram of an optical receiver according to a fourth embodiment of the present invention.

FIG. 20 shows a configuration of the optical receiver 200 of the present embodiment. The optical receiver 200 includes an optical filter 240, two delay interferometers 230-1 and 230-2, balanced photoelectric conversion units 210-2 and 210-3 which convert outputs thereof into electric signals, and a reception signal processing unit 220-2 which extracts data from outputs thereof.

Figure 21:
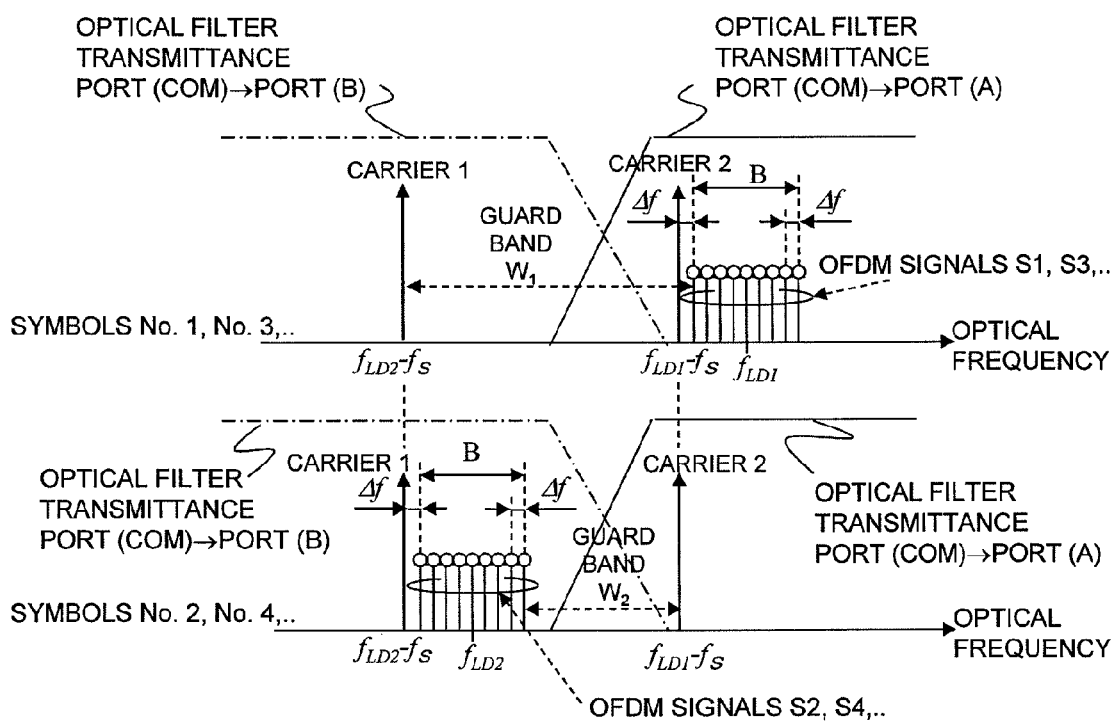
FIG. 21 is a schematic diagram of a spectrum illustrating a transmittance of an optical filter which is used along with the optical receiver according to the fourth embodiment of the present invention.

An operation of the optical receiver 200 will now be described. A spectrum of light incident to the optical receiver 200 is, for example, as shown in FIG. 19. Hereinafter, a description will be made using the optical OFDM signal of the third embodiment. First, this light is incident to the optical filter 240. A transmittance of the optical filter 240 and a spectrum of the input light are shown in FIG. 21. In FIG. 21, a transmittance from the input port (COM) to the output port (A) of FIG. 20 is indicated by the solid line, and a transmittance from the input port (COM) to the output port (B) is indicated by the dot chain line. In other words, the carrier 1 is cut off in the output port (A), and the carrier 2 is cut off in the output port (B). For example, a frequency lower than $f_{LD2}$+B/2 is cut off on the output port (A) side, and a frequency higher than $f_{LD1}-f_S$ is cut off on the output port (B) side.

Therefore, the light of the output port (A) is constituted by the carrier 2 and the OFDM signals S1, S3, . . . at the time points of the symbols No. 1, No. 3, . . . , and is constituted by the carrier 2 at the time points of the symbols No. 2, No. 4, . . . . Similarly, the light of the output port (B) is constituted by only the carrier 1 at the time points of the symbols No. 1, No. 3, . . . , and is constituted by the OFDM signals S2, S4, . . . and the carrier 1 at the time points of the symbols No. 2, No. 4, . . . .

The light beams of the port (A) and the port (B) are incident to the delay interferometers 230-1 and 230-2. Output light beams thereof are converted into electric signals by the balanced photoelectric conversion units 210-2 and 210-3 and are guided to the reception signal processing unit 220-2.

Figure 22:
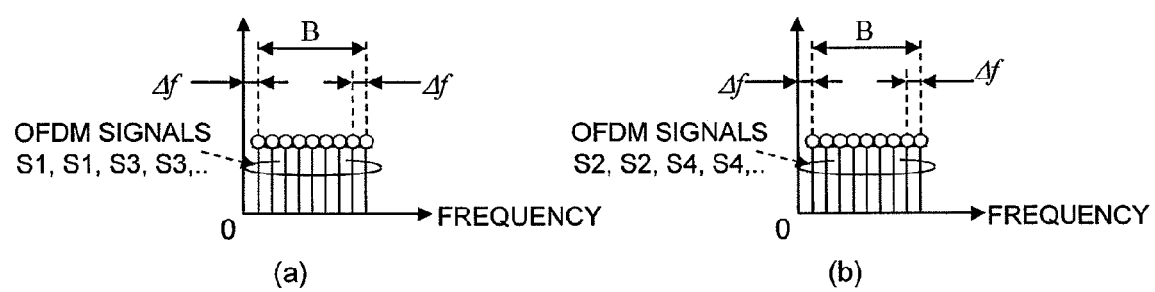
FIG. 22 is a schematic diagram of a spectrum of a received electric signal of an optical receiver according to the fourth embodiment of the present invention.

In addition, a spectrum of the output signal of the balanced photoelectric conversion unit 210-2 is shown in FIG. 22(a). Signals obtained at the time points of the OFDM symbols No. 1, No. 2, No. 3, No. 4, . . . are OFDM signals S1, S1, S3, S3, . . . , and the same signal is repeated at two continuous symbols. This is also the same for output signals of the balanced photoelectric conversion unit 210-3, signals obtained at the time points of the OFDM symbols No. 1, No. 2, No. 3, No. 4, . . . are OFDM signals S2, S2, S4, S4, . . . , and the same signal is repeated at two continuous symbols.

Figure 23:
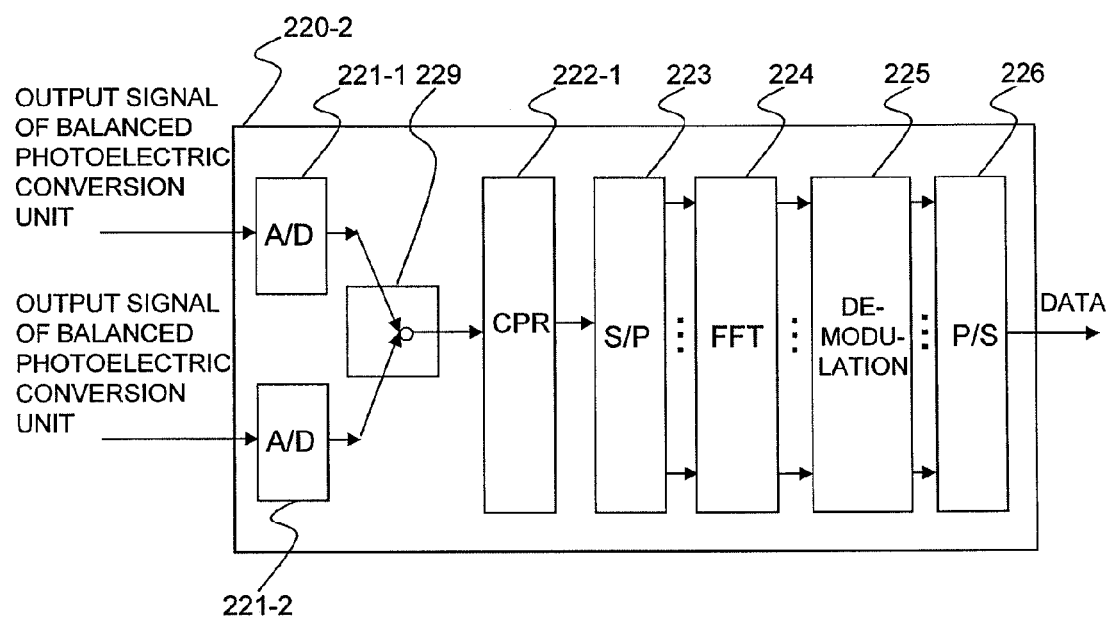
FIG. 23 is a functional block diagram of a reception signal processing unit of the optical receiver according to the fourth embodiment of the present invention.

FIG. 23 is a functional block diagram of the reception signal processing unit 220-2. The output signals of the balanced photoelectric conversion units 210-2 and 210-3 are respectively converted into digital signals by the analog-digital (AD) conversion portions 221-1 and 221-2. These outputs are input as two input signals of a 2×1 electric switch 229 and are selectively output in synchronization with the timing of the OFDM symbol. Therefore, an output thereof is obtained as the OFDM signals S1, S2, S3, S4, . . . and desired signals at the time points of the symbols No. 1, No. 2, No. 3, No. 4, . . . .

The output of the 2×1 electric switch 229 subsequently undergoes a received signal process in the same as in the related example, and is output from the optical receiver 200 as received data.

The above description relates to the present embodiment.

Further, although the description of the present embodiment has been made using the optical OFDM signal from the transmitter 100 of the third embodiment, the optical receiver 200 is applicable to the light (a spectrum thereof is as shown in FIG. 7) of the optical transmitter 100 used in the first and second embodiments.

As an advantage unique to the present embodiment, the width $W_2$ of the guard band can be determined using a slope (refer to FIG. 21) of the transmittance of the optical filter 240. In other words, in a case of using the optical filter 240 having a steep width of a transition area (the transition area from a transmissive area to a cutoff area), the frequency width $W_2$ of the guard band can be set to be smaller conforming with the width. In other words, $W_2$ can be set to be smaller than in the condition regarding $W_2$ of Expression (7). There is an advantage in that it is possible to realize an optical communication system in which an occupied optical spectrum is narrow, that is, an optical communication system having high frequency use efficiency.

5. Others

In addition, in the above description of each of the first, second, third and fourth embodiments, a case where the optical transmitter 100 and the optical receiver 200 are individually present at different locations has been described; however, needless to say, a case where functions of the optical transmitter 100 and the optical receiver 200 are realized in the same optical communication device and communication is performed between the optical communication devices can be another embodiment. Further, in this case, as still another embodiment, the optical transmitter 100 and the optical receiver 200 may be mounted in the same casing or board and form a so-called transponder.

According to each of the above-described embodiments, it is possible to provide an optical OFDM communication system and an optical transceiver capable of reducing receiver sensitivity degradation due to an inter-subcarrier beat signal in the optical OFDM communication system. In addition, it is possible to realize an optical OFDM communication system and an optical transceiver by using parts in which bandwidths of analog parts (a driver, a DA conversion circuit, a pre-amplifier, an AD conversion circuit, and the like) used for a transmitter and a receiver are restricted by about twice the signal bandwidth, and to thereby provide a communication system and an optical transceiver at lower costs than in the related art. Further, in each of the above-described embodiments, since the direct detection reception method is used, a configuration is simpler than in a coherent reception method, and thus it is possible to provide a communication system and an optical transceiver at a low cost.

6. Configuration Example

The optical communication system includes, for example, an optical transmitter that maps digital data which is information to a plurality of subcarriers which are orthogonal to each other over symbol time so as to be modulated and transmitted as an optical signal via an optical fiber; and an optical receiver that performs photoelectric conversion on the optical signal which has propagated through the optical fiber by using a photodiode and demodulates each subcarrier signal so as to reproduce original digital data.

The optical transmitter includes a transmission signal processing unit that maps digital data which is information to a plurality of subcarriers orthogonal to each other over symbol time so as to be modulated, and performs inverse fast Fourier transform (inverse FFT) on the modulated subcarrier so as to generate a base band OFDM signal; and an electric-optic conversion unit that modulates the base band OFDM signal into laser light so as to generate an optical OFDM signal. Optical OFDM signals with two different wavelengths are alternately transmitted for each symbol time.

The optical receiver includes at least one set of a delay interferometer that delays the optical OFDM signal transmitted from the optical transmitter via the optical fiber and a balanced photoelectric conversion unit that converts the optical signal into an electric signal; and a reception signal processing unit that performs analog-digital (A/D) conversion on an output of the photoelectric conversion unit, performs fast Fourier transform (FFT) on the A/D-converted signal so as to obtain a subcarrier signal, demodulates data from the subcarrier signal, and converts the demodulated data into serial data so as to reproduce original digital data.

In the above-described optical communication system, as one of the features, the optical transmitter alternately changes a wavelength of an optical OFDM signal including a plurality of subcarriers and a carrier for each symbol time so as to be transmitted.

In the above-described optical communication system, as one of the features, a difference between a frequency of the carrier and a frequency of the individual subcarrier is at least equal to or more than a half of the entire bandwidth of the plurality of subcarriers.

In the above-described optical communication system, as one of the features, the reception signal processing unit subtracts data of a subcarrier which was input one symbol time ago for each subcarrier which is obtained through FFT.

In the above-described optical communication system, the optical receiver includes an optical filter that wavelength-demultiplexes light beams with two wavelengths of an optical OFDM signal sent from the transmitter to two output ports; and a reception signal processing unit that makes light beams from the two output ports of the optical filter respectively incident to two delay interferometers, makes outputs of two delay interferometers respectively converted into electric signals in two balanced photoelectric conversion units, performs analog-digital (A/D) conversion on the electric signals, alternately selects the two A/D-converted signals for each OFDM symbol time, performs fast Fourier transform (FFT) on the selected signal so as to obtain a subcarrier signal, demodulates data from the subcarrier signal, and converts the demodulated data into serial data so as to reproduce original digital data.

In the above-described optical communication system, as one of the features, a delay time in the delay interferometer is substantially the same as the symbol time.

INDUSTRIAL APPLICABILITY

The present invention is applicable to, for example, an optical communication system.

REFERENCE SIGNS LIST

100: Optical transmitter
110, 110-1, and 110-2: Transmission signal processing unit 111 and 223: Serial-parallel conversion (S/P) portion
112: Subcarrier modulation portion
113: Inverse fast Fourier transform (FFT) portion
114 and 226: Parallel-serial conversion (P/S) portion
115: Cyclic prefix insertion (CPI) portion
116 and 116-1: Digital-analog conversion (DA) portion
117-1 and 117-2: 1×2 electric switch
120 and 120-2: Electric-optic conversion unit
121 and 121-1: Laser
122, 122-1, and 122-2: IQ optical modulator
123, 123-1, 123-2, 123-3, 123-4, and 126: RF oscillator
124, 124-1, and 124-2: Phase shifter
125, 125-1, 125-2, and 125-3: Adder
127, 127-1, 127-2, and 229: 2×1 electric switch
128: Mach-Zehnder optical modulator
129, 130, 240, and 400: Optical filter
200: Optical receiver
210, 210-2, and 210-3: Balanced photoelectric conversion unit
211-1: Photodiode
212-1, 212-2, and 212-3: Pre-amplifier
213: Subtractor
220 and 220-2: Reception signal processing unit
221, 221-1, and 221-2: Analog-digital conversion (AD) portion
222 and 222-1: Cyclic prefix removal (CPR) portion
223: Serial-parallel conversion (S/P) portion
224: Fast Fourier transform (FFT) portion
225: Subcarrier demodulation portion
227 and 227-1: Differential amplifier
228 and 228-1: Delay circuit
230, 230-1, and 230-2: Delay interferometer
231 and 232: Optical coupler
233: Delay time portion
300: Optical fiber

The invention claimed is:

1. An optical communication system comprising:
an optical transmitter that maps digital data to a plurality of subcarriers which are orthogonal to each other over symbol time so as to be modulated and transmitted as an optical signal via an optical fiber; and
an optical receiver that performs photoelectric conversion on the optical signal which has propagated through the optical fiber and demodulates each subcarrier signal so as to reproduce original digital data, wherein
the optical transmitter includes
a transmission signal processing unit that maps digital data to a plurality of subcarriers orthogonal to each other over symbol time so as to be modulated, and generates a base band OFDM signal from the modulated subcarrier signal; and
an electric-optic conversion unit that modulates the base band OFDM signal into laser light so as to generate an optical OFDM signal,
the transmission signal processing unit and the electric-optic conversion unit transmit optical OFDM signals with alternately different wavelengths for each symbol time, and
the optical receiver includes
at least one set of a delay interferometer that delays a portion of the optical OFDM signal received from the optical transmitter via the optical fiber by the symbol time so as to be combined with the optical OFDM signal and a balanced photoelectric conversion unit that converts the combined optical signal into an electric signal; and
a reception signal processing unit that obtains a subcarrier signal from an output of the photoelectric conversion unit and demodulates data from the subcarrier signal so as to reproduce original digital data.

2. The optical communication system according to claim 1, wherein the optical transmitter alternately changes a wavelength of an optical OFDM signal including a plurality of subcarriers and a carrier for each symbol time so as to be transmitted.

3. The optical communication system according to claim 2, wherein a difference between a frequency of the carrier and a frequency of the individual subcarrier is at least equal to or more than a half of the entire bandwidth of the plurality of subcarriers.

4. The optical communication system according to claim 1, wherein, the optical transmitter,
in relation to a first carrier and a second carrier with a frequency higher than a frequency of the first carrier,
generates a first optical OFDM signal including a plurality of subcarriers and the first carrier present on a lower sideband wave of the subcarriers,
generates a second optical OFDM signal including a plurality of subcarriers and the second carrier present on an upper sideband wave of the subcarriers, and
alternately transmits the first and second optical OFDM signals for each symbol time.

5. The optical communication system according to claim 1, wherein the reception signal processing unit performs analog-digital (A/D) conversion on an output of the photoelectric conversion unit, and subtracts data of a subcarrier which was input one symbol time ago for each subcarrier which is obtained by performing fast Fourier transform on the converted signal, so as to obtain a subcarrier for each symbol time.

6. The optical communication system according to claim 1, wherein
the optical receiver further includes:
an optical filter that wavelength-demultiplexes an optical OFDM signal from the optical transmitter to two output ports according to a wavelength of the optical OFDM signal,
wherein light beams from the two output ports of the optical filter are respectively incident to two delay interferometers, and outputs of the two delay interferometers are respectively converted into electric signals by two balanced photoelectric conversion units, and
the reception signal processing unit alternately selects the converted electric signal for each symbol time, and obtains a subcarrier signal from the selected signal so as to reproduce original digital data.

7. The optical communication system according to claim 1, wherein the electric-optic conversion unit includes:
a light source portion that alternately outputs light of two wavelengths for each symbol time;
oscillation portions that respectively generate sine signals and cosine signals with two frequencies;
a first adder that alternately adds the cosine signals with the two frequencies to a real part of a base band OFDM signal for each symbol time;
a second adder that alternately adds the sine signals with the two frequencies to an imaginal part of the base band OFDM signal for each symbol time; and
an IQ optical modulator that modulates light from the light source portion with signals from the first and second adders so as to output an optical OFDM signal.

8. The optical communication system according to claim 7, wherein the sine signals with the two frequencies are out of phase.

9. The optical communication system according to claim 1, wherein
the electric-optic conversion unit includes:
a light source portion that alternately outputs light of two wavelengths for each symbol time;
oscillation portions that respectively generate cosine signals with two different frequencies;
an adder that alternately adds the cosine signals with the two frequencies to a real part of a base band OFDM signal for each symbol time; and
an IQ optical modulator that modulates light from the light source portion with a signal from the adder and an imaginal part of the base band OFDM signal so as to be output,
the optical transmitter further includes a band-pass filter that cuts off one of two carriers appearing on both sides of an OFDM signal.

10. The optical communication system according to claim 1, wherein
the transmission signal processing unit includes:
an oscillation portion that generates a sine signal and a cosine signal;
a first adder that adds the cosine signal from the oscillation portion to a real part of a base band OFDM signal; and
a second adder that adds the sine signal from the oscillation portion to an imaginal part of the base band OFDM signal,
the electric-optic conversion unit includes:
a light source portion that outputs light beams with two wavelengths;
a first IQ optical modulator that modulates one of the light beams from the light source portion with a signal from the first adder; and
a second IQ optical modulator that modulates the other of the light beams from the light source portion with a signal from the second adder, and
wherein the signal from the first adder and the signal from the second adder are alternately input to the first IQ optical modulator and the second IQ optical modulator for each symbol time, and the electric-optic conversion unit wavelength-multiplexes outputs of the first IQ optical modulator and the second IQ optical modulator so as to be output.

11. An optical transmitter in an optical communication system comprising the optical transmitter that maps digital data to a plurality of subcarriers which are orthogonal to each other over symbol time so as to be modulated and transmitted as an optical signal via an optical fiber and an optical receiver that delays by the symbol time a portion of the optical signal which has propagated through the optical fiber so as to be combined with the optical signal, performs photoelectric conversion on the combined optical signal, and demodulates each subcarrier signal so as to reproduce original digital data,
the optical transmitter comprising:
a transmission signal processing unit that maps digital data to a plurality of subcarriers orthogonal to each other over symbol time so as to be modulated, and generates a base band OFDM signal from the modulated subcarrier signal; and
an electric-optic conversion unit that modulates the base band OFDM signal into laser light so as to generate an optical OFDM signal,
wherein the transmission signal processing unit and the electric-optic conversion unit transmit optical OFDM signals with alternately different two wavelengths for each symbol time.

12. A transponder in an optical communication system comprising:
an optical transmitter that maps digital data to a plurality of subcarriers which are orthogonal to each other over symbol time so as to be modulated and transmitted as an optical signal via an optical fiber; and
an optical receiver that performs photoelectric conversion on the optical signal which has propagated through the optical fiber and demodulates each subcarrier signal so as to reproduce original digital data,
the transponder comprising the optical transmitter and the optical receiver, wherein
the optical transmitter includes
a transmission signal processing unit that maps digital data to a plurality of subcarriers orthogonal to each other over symbol time so as to be modulated, and generates a base band OFDM signal from the modulated subcarrier signal; and
an electric-optic conversion unit that modulates the base band OFDM signal into laser light so as to generate an optical OFDM signal,
wherein the transmission signal processing unit and the electric-optic conversion unit transmit optical OFDM signals with alternately different two wavelengths for each symbol time, and
the optical receiver includes
at least one set of a delay interferometer that delays a portion of the optical OFDM signal received from the optical transmitter via the optical fiber by the symbol time so as to be combined with the optical OFDM signal and a balanced photoelectric conversion unit that converts the combined optical signal into an electric signal; and
a reception signal processing unit that obtains a subcarrier signal from an output of the photoelectric conversion unit and demodulates data from the subcarrier signal so as to reproduce original digital data.

* * * * *